(12) United States Patent
Yamasaki et al.

(10) Patent No.: US 12,493,348 B2
(45) Date of Patent: Dec. 9, 2025

(54) DISPLAY CONTROL APPARATUS

(71) Applicant: NTT DOCOMO, INC., Tokyo (JP)

(72) Inventors: Tomohito Yamasaki, Chiyoda-ku (JP); Susumu Sekino, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/834,295

(22) PCT Filed: Jan. 23, 2023

(86) PCT No.: PCT/JP2023/001884
§ 371 (c)(1),
(2) Date: Jul. 30, 2024

(87) PCT Pub. No.: WO2023/149256
PCT Pub. Date: Aug. 10, 2023

(65) Prior Publication Data
US 2025/0155971 A1    May 15, 2025

(30) Foreign Application Priority Data
Feb. 2, 2022 (JP) .................. 2022-015007

(51) Int. Cl.
*G06F 3/01* (2006.01)
(52) U.S. Cl.
CPC .................. *G06F 3/013* (2013.01)
(58) Field of Classification Search
CPC .... G06F 3/04842; G06F 3/013; G06F 3/0484; G06F 3/0481; G06F 3/0482; G06F 3/04817
See application file for complete search history.

(56) References Cited

U.S. PATENT DOCUMENTS

| | | | | |
|---|---|---|---|---|
| 12,033,380 | B2* | 7/2024 | Sugihara | G09G 5/36 |
| 2008/0215994 | A1* | 9/2008 | Harrison | H04L 67/131 |
| | | | | 715/757 |
| 2017/0186232 | A1* | 6/2017 | Dange | G06F 3/011 |
| 2021/0004081 | A1* | 1/2021 | Sugihara | G06F 3/013 |
| 2021/0165484 | A1* | 6/2021 | Suguhara | G06F 3/013 |

FOREIGN PATENT DOCUMENTS

| | | | |
|---|---|---|---|
| JP | 2010-535363 A | 11/2010 | |
| JP | 2020162136 | * 10/2020 | H04N 5/74 |

OTHER PUBLICATIONS

International Search Report mailed on Mar. 28, 2023 in PCT/JP2023/001884 filed on Jan. 23, 2023 (4 pages, with English Translation).

* cited by examiner

*Primary Examiner* — Matthew A Eason
*Assistant Examiner* — Scott D Au
(74) *Attorney, Agent, or Firm* — Oblon, McClelland, Maier & Neustadt, L.L.P.

(57) ABSTRACT

A display control apparatus includes (i) an acquirer configured to acquire a notification, (ii) a generator configured to generate a virtual object corresponding to the notification, (iii) a display controller configured to display the virtual object in a virtual space in which a first user exists, (iv) a determiner configured to determine whether a distance between the virtual object and the first user is equal to or less than a predetermined distance in the virtual space, when the first user is included in recipient information, and (v) a movement controller configured to bring the virtual object closer to the first user, when a determination result of the determiner is affirmative.

9 Claims, 12 Drawing Sheets

DISPLAY CONTROL APPARATUS

TECHNICAL FIELD

The present invention relates to a display control apparatus. In particular, the present invention relates to display control apparatuses for displaying a virtual object corresponding to a notification in a virtual space.

BACKGROUND ART

XR glasses to which an extended reality (XR) technology, including virtual reality (VR) technology, augmented reality (AR) technology, and mixed reality (MR) technology are applied is known. XR glasses are mounted on the head of a user. A message indicated by a virtual object may be displayed in a virtual space displayed on the XR glasses.

For example, Patent Document 1 discloses a technology of sharing a message in order to achieve communication between users in a virtual space. Specifically, Patent Document 1 discloses a technology for displaying a virtual object indicating a "graffiti message" in a virtual space shared between users.

RELATED ART DOCUMENT

Patent Document

Patent Document 1: Japanese Translation of PCT International Application Publication No. JP-T-2010-535363

SUMMARY OF THE INVENTION

Problem to be Solved by the Invention

When a virtual object corresponding to a notification including a message is displayed in a virtual space, as the number of notifications increases, the number of virtual objects also increases. As a result, the virtual space displayed on the XR glasses worn on the head of a user may be filled with virtual objects. That is, in the technology according to the related art, there is a problem in that convenience is deteriorated due to obstruction of the field of view of the user.

An object of the present invention is to provide a display control apparatus that can suppress a decrease in convenience for a user even when the number of virtual objects increases based on the number of notifications when a virtual space including the virtual object corresponding to the notification is displayed.

Means for Solving the Problems

A display control apparatus according to a preferred aspect of the present invention is a display control apparatus including (i) an acquirer configured to acquire a notification, (ii) a generator configured to generate a virtual object corresponding to the notification, (iii) a display controller configured to display the virtual object in a virtual space in which a first user exists, (iv) a determiner configured to determine whether a distance between the virtual object and the first user is equal to or less than a predetermined distance in the virtual space, when the first user is included in recipient information indicating one or more recipients of the notification, and (v) a movement controller configured to move the virtual object to bring the virtual object closer to the first user, when the determination result of the determiner is affirmative, and configured not to move the virtual object, when the determination result of the determiner is negative.

Effect of the Invention

According to the present invention, it is possible to suppress a decrease in convenience for a user even when the number of virtual objects increases based on the number of notifications, when a virtual space including the virtual object corresponding to the notification is displayed.

MODES FOR CARRYING OUT THE INVENTION

1: First Embodiment

With reference to FIGS. 1 to 7, description will be given of a configuration of an information processing system 1 including a terminal apparatus 10 as a display control apparatus according to a first embodiment of the present invention.

1-1: Configuration of First Embodiment 1-1-1: Overall Configuration

Figure 1:
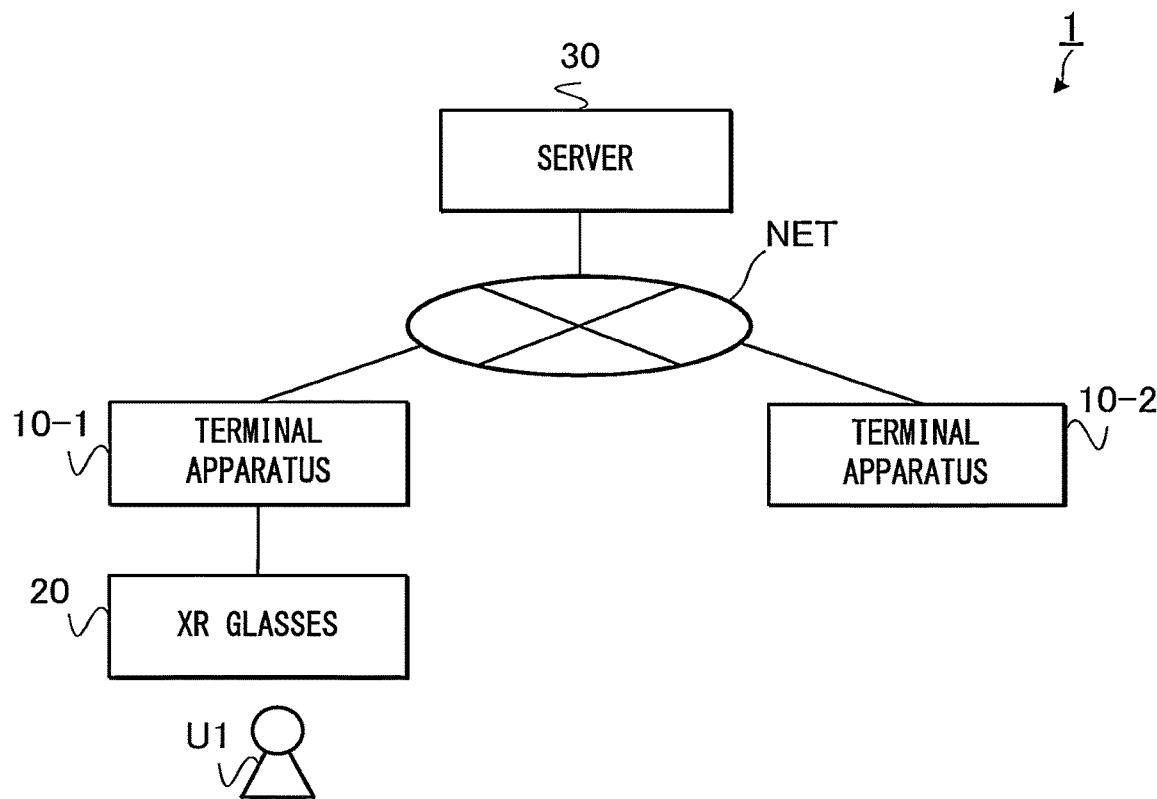
FIG. 1 is a diagram illustrating an overall configuration of an information processing system 1 according to a first embodiment.

FIG. 1 illustrates an overall configuration of the information processing system 1. As shown in FIG. 1, the information processing system 1 includes terminal apparatuses 10-1 and 10-2, extended reality (XR) glasses 20, and a server 30. In the following description, in a case of distinguishing the terminal apparatus 10 used for each user, an "-X" is appended to the reference numeral. The X is an freely chosen integer of 1 or more. The same applies to the components of each terminal apparatus 10. Furthermore, in the following description, if it is not necessary to distinguish the terminal apparatuses 10-1 and 10-2, the terminal apparatus 10 is used as a generic name of the terminal apparatuses 10-1 and 10-2. The terminal apparatus 10 is an example of the display control apparatus. In the information processing system 1, the terminal apparatus 10 and the server 30 are communicably connected to each other via a communication network NET. The terminal apparatus 10 and the XR glasses 20 are communicably connected to each other. In FIG. 1, two terminal apparatuses 10-1 and 10-2 and one pair of XR glasses 20 are described. However, the numbers are merely an example, and the information processing system 1 may include any number of terminal apparatuses 10 and any number of pairs of XR glasses 20.

In FIG. 1, it is envisaged that a user U1 uses a set of the terminal apparatus 10-1 and the pair of XR glasses 20. In the information processing system 1 illustrated in FIG. 1, virtual objects for the respective notifications are displayed on the XR glasses 20. The notifications may include a notification transmitted from the terminal apparatus 10-2 to the terminal apparatus 10-1. The notifications may include a notification transmitted from the terminal apparatus 10-1 to the terminal apparatus 10-2. The notifications may include a message transmitted from another terminal apparatus (not illustrated in FIG. 1) to the terminal apparatus 10-1. The notification may be a notification generated by the terminal apparatus 10-1 itself.

The server 30 provides a variety of types of data and cloud services to the terminal apparatus 10 via the communication network NET.

The terminal apparatus 10-1 causes the XR glasses 20 worn on the head of the user U1 to display the virtual object arranged in a virtual space. The virtual space is, for example, a celestial sphere-shaped space. Examples of the virtual object include a virtual object indicating data, such as a still image, a moving image, a three-dimensional computer graphics (3DCG) model, a hypertext markup language (HTML) file, or a text file, and a virtual object indicating an application. Examples of the text file include a memo, a source code, a diary, and a recipe. Examples of the application include a browser, an application for using a social network service (SNS), and an application for generating a document file. The terminal apparatus 10 is preferably a portable terminal apparatus such as a smartphone or a tablet. The terminal apparatus 10-1 is an example of the display control apparatus.

The terminal apparatus 10-2 is an apparatus for a user U2 to transmit a message to the user U1. The terminal apparatus 10-2 may display the virtual object arranged in the virtual space on a display 14 (described below) or XR glasses (not illustrated) connected to the terminal apparatus 10-2. If the terminal apparatus 10-2 is an apparatus that displays the virtual object, a configuration of the terminal apparatus 10-2 is basically the same as that of the terminal apparatus 10-1. The terminal apparatus 10-2 is preferably a portable terminal apparatus such as a smartphone or a tablet like the terminal apparatus 10-1.

The XR glasses 20 are a see-through wearable display to be worn on the head of the user U1. The XR glasses 20 are controlled by the terminal apparatus 10 to display the virtual object on a display panel provided in each of the lenses for the eyes. The user U1 can view the virtual space including the virtual object by wearing the XR glasses. A pair of the XR glasses 20 is an example of a display device. An example will now be described in which the XR glasses 20 are mixed reality (MR) glasses. However, the XR glasses 20 being the MR glasses is merely an example, and the XR glasses 20 may be virtual reality (VR) glasses or augmented reality (AR) glasses.

1-1-2: Configuration of XR Glasses

Figure 2:
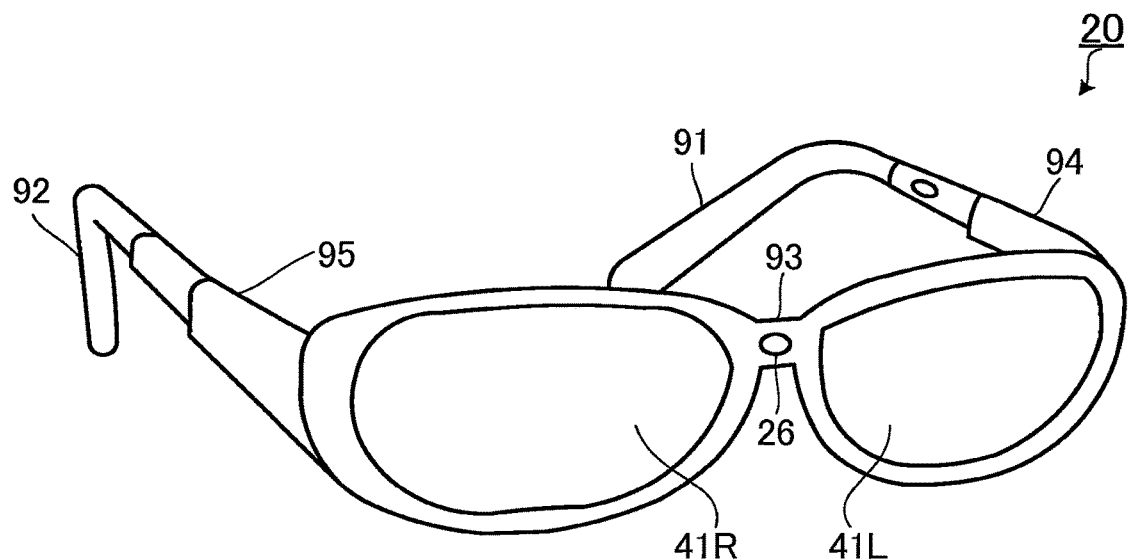
FIG. 2 is a perspective view illustrating an appearance of extended reality (XR) glasses 20 according to the first embodiment.

FIG. 2 is a perspective view illustrating an appearance of the XR glasses 20. As shown in FIG. 2, the appearance of the XR glasses 20 includes temples 91 and 92, a bridge 93, frames 94 and 95, and lenses 41L and 41R, which is the same as general glasses.

An image capture device 26 is provided in the bridge 93. The image capture device 26 captures an image of the outside world. The image capture device 26 outputs image capture information indicating a captured image.

Each of the lenses 41L and 41R includes a half mirror. A left-eye liquid crystal panel or organic electroluminescent (EL) panel is provided in the frame 94. The liquid crystal panel or organic EL panel is hereinafter collectively referred to as a display panel. An optical member that guides light emitted from the left-eye display panel to the lens 41L is provided in the frame 94. The half mirror provided in the lens 41L transmits light from the outside world, guides the light to the left eye, and reflects the light guided by the optical member to be incident on the left eye. A right-eye display panel and an optical member that guides light emitted from the right-eye display panel to the lens 41R are provided in the frame 95. The half mirror provided in the lens 41R transmits light from the outside world, guides the light to the right eye, and reflects the light guided by the optical member to be incident on the right eye.

A display 28 described below includes the lens 41L, the left-eye display panel, the left-eye optical member, the lens 41R, the right-eye display panel, and the right-eye optical member.

In this configuration, the user U1 can see an image displayed on the display panel in a see-through state in which the image is superimposed on the outside world. In the XR glasses 20, a left-eye image from among binocular images with parallax is displayed on the left-eye display panel, and a right-eye image is displayed on the right-eye display panel. As a result, the XR glasses 20 makes the user perceive the displayed images as if the displayed images have depth and are stereoscopic.

Figure 3:
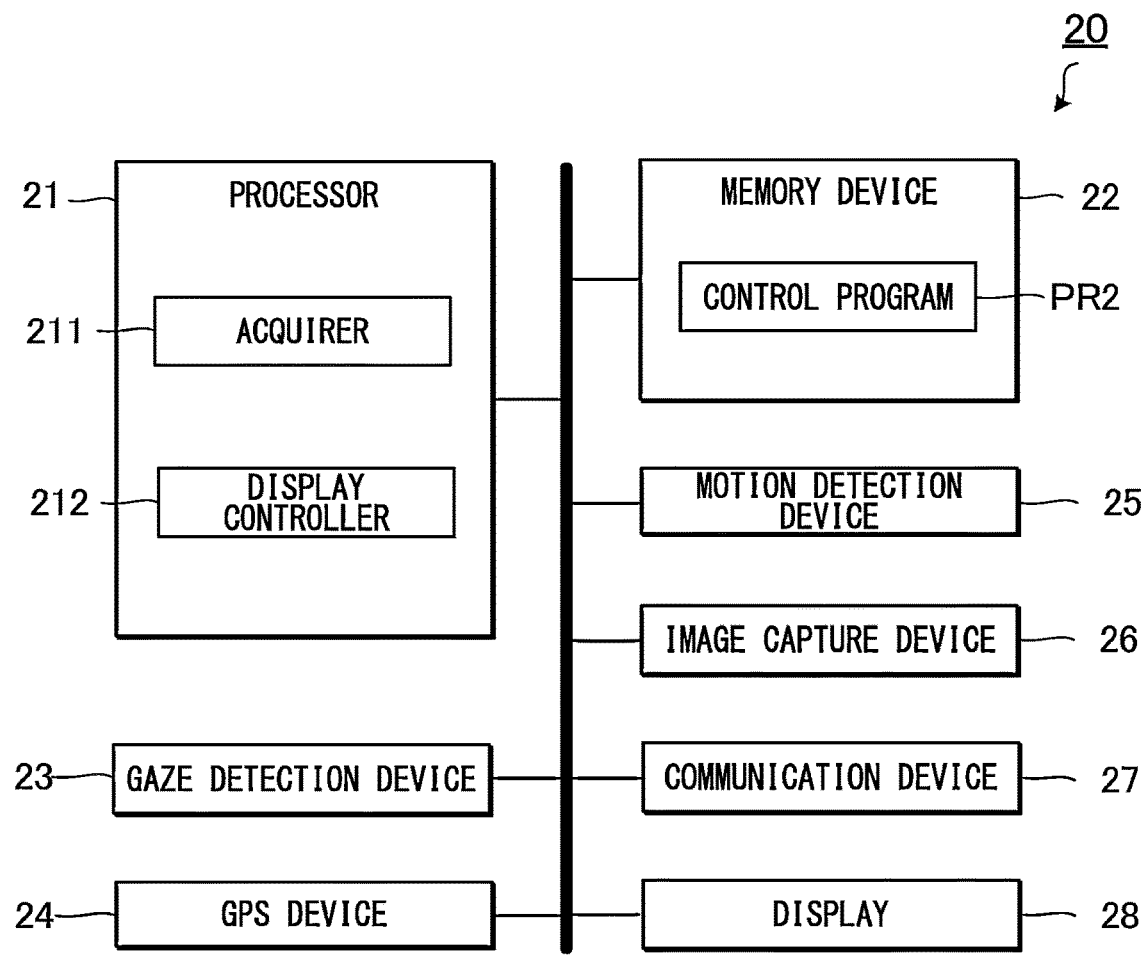
FIG. 3 is a block diagram illustrating an example of a configuration of the XR glasses 20 according to the first embodiment.

FIG. 3 is a block diagram illustrating an example of a configuration of the XR glasses 20. The XR glasses 20 include a processor 21, a memory device 22, a gaze detection device 23, a global positioning system (GPS) device 24, a motion detection device 25, the image capture device 26, a communication device 27, and the display 28. The elements included in the XR glasses 20 are mutually connected by one or more buses for communicating information. The term "apparatus" in the present specification may be replaced with another term such as circuit, device, or unit.

The processor 21 is a processor that controls the entire XR glasses 20. The processor 21 comprises one or more chips. The processor 21 may comprise a central processing unit (CPU) including an interface with a peripheral device, an arithmetic device, a register. One, some, or all of the functions of the processor 21 may be implemented by hardware, such as a digital signal processor (DSP), an application specific integrated circuit (ASIC), a programmable logic device (PLD), or a field programmable gate array (FPGA). The processor 21 executes a variety of types of processing in parallel or sequentially.

The memory device 22 is a recording medium that can be read from and written to by the processor 21. The memory device 22 stores programs including a control program PR2 to be executed by the processor 21.

The gaze detection device 23 detects a gaze of the user U1 and generates gaze information indicating a detection result. The gaze detection device 23 may use any method to detect the gaze. For example, the gaze detection device 23 may detect the gaze information based on the position of the inner corner of the eye and the position of the iris. The gaze information indicates a direction of the gaze of the user U1. The gaze detection device 23 supplies the gaze information to the processor 21 described below. The gaze information supplied to the processor 21 is transmitted to the terminal apparatus 10 via the communication device 27.

The GPS device 24 receives radio waves from satellites. The GPS device 24 generates position information based on the received radio wave. The position information indicates the position of the XR glasses 20. The position information may have any format so long as the position can be specified. The position information indicates, for example, the latitude and longitude of the XR glasses 20. The position information may be obtained from the GPS device 24. However, the XR glasses 20 may acquire the position information by any method. The acquired position information is supplied to the processor 21. The position information supplied to the processor 21 is transmitted to the terminal apparatus 10 via the communication device 27.

The motion detection device 25 detects a motion of the XR glasses 20. The motion detection device 25 corresponds to an inertial sensor, such as an acceleration sensor that detects an acceleration, or a gyroscopic (gyro) sensor that detects an angular acceleration. The acceleration sensor detects accelerations on an X axis, a Y axis, and a Z axis orthogonal to each other. The gyro sensor detects angular accelerations with the X axis, the Y axis, and the Z axis as central axes of rotation. The motion detection device 25 can generate orientation information indicating an orientation of the XR glasses 20 based on output information of the gyro sensor. Motion information includes acceleration data indicating accelerations on three axes and angular acceleration data indicating angular accelerations on three axes. The motion detection device 25 supplies, to the processor 21, the orientation information indicating the orientation of the XR glasses 20 and the motion information regarding the motion of the XR glasses 20. The orientation information and the motion information supplied to the processor 21 are transmitted to the terminal apparatus 10 via the communication device 27.

The image capture device 26 outputs the image capture information obtained by capturing an image of the outside world. The image capture device 26 includes a lens, an image capture element, an amplifier, and an AD converter. Light focused through the lens is converted into an image capture signal, which is an analog signal, by the imaging element. The amplifier amplifies the image capture signal and outputs the amplified signal to the AD converter. The AD converter converts the amplified image capture signal, which is an analog signal, into the image capture information, which is a digital signal. The converted image capture information is supplied to the processor 21. The image capture information supplied to the processor 21 is transmitted to the terminal apparatus 10 via the communication device 27.

The communication device 27 is hardware, such as a transmission and receiving device for communicating with other devices. The communication device 27 is also called a network device, a network controller, a network card, or a communication module. The communication device 27 includes a connector for wired connection, and it may include an interface circuit corresponding to the connector. The communication device 27 may include a wireless communication interface. Examples of the connector for wired connection and the interface circuit include products complying with wired local area network (LAN), Institute of Electrical and Electronics Engineers (IEEE) 1394, and universal serial bus (USB). Examples of the wireless communication interface include products complying with a wireless LAN, and Bluetooth (registered trademark).

The display 28 is a device that displays images. The display 28 displays a variety of images under the control of the processor 21. The display 28 includes the lens 41L, the left-eye display panel, and the left-eye optical member, the lens 41R, the right-eye display panel, and the right-eye optical member. As the display panel, a variety of display panels, such as a liquid crystal display panel or an organic EL display panel, are used, as appropriate.

The processor 21 reads out the control program PR2 from the memory device 22 and executes it, to act as an acquirer 211 and a display controller 212.

The acquirer 211 acquires from the terminal apparatus 10, image information indicating an image to be displayed by the XR glasses 20.

The acquirer 211 acquires the gaze information input from the gaze detection device 23, the position information input from the GPS device 24, the orientation information and the motion information input from the motion detection device 25, and the image capture information input from the image capture device 26. Then, the acquirer 211 outputs the acquired gaze information, position information, orientation information, motion information, and image capture information to the communication device 27.

The display controller 212 causes the display 28 to display the image indicated by the image information based on the image information acquired from the terminal apparatus 10 by the acquirer 211.

1-1-3: Configuration of Terminal Apparatus

Figure 4:
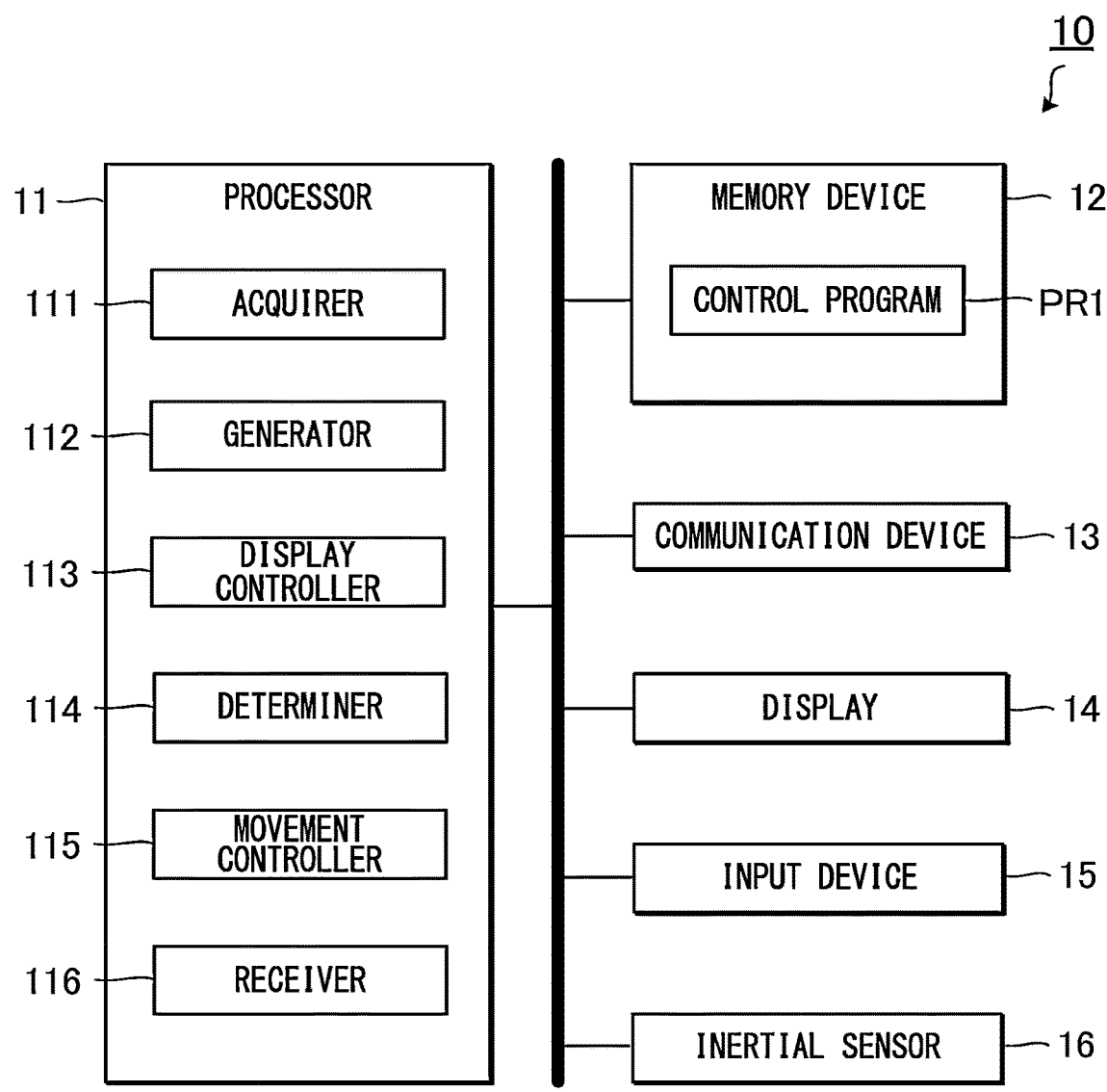
FIG. 4 is a block diagram illustrating an example of a configuration of a terminal apparatus 10 according to the first embodiment.

FIG. 4 is a block diagram illustrating an example of a configuration of the terminal apparatus 10. The terminal apparatus 10 includes a processor 11, a memory device 12, a communication device 13, a display 14, an input device 15, and an inertial sensor 16. The elements included in the terminal apparatus 10 are mutually connected by one or more buses for communicating information. Description will be given in which the terminal apparatus 10 is the terminal apparatus 10-1 used by the user U1.

The processor 11 controls the entire terminal apparatus 10. The processor 11 comprises one or more chips. The processor 11 comprises a central processing unit (CPU) including an interface with a peripheral device, an arithmetic device, and a register. One, some, or all of the functions of the processor 11 may be implemented by hardware, such as a DSP, an ASIC, a PLD, or an FPGA. The processor 11 executes a variety of types of processing in parallel or sequentially.

The memory device 12 is a recording medium that is readable from and writable to by the processor 11. The memory device 12 stores programs including a control program PR1 to be executed by the processor 11. The memory device 12 may further store the image information indicating the image to be displayed on the XR glasses 20.

The communication device 13 is hardware, such as a transmission and receiving device for communicating with other devices. The communication device 13 is also called a network device, a network controller, a network card, or a communication module. The communication device 13 includes a connector for wired connection, and it may include an interface circuit corresponding to the connector. The communication device 13 may include a wireless communication interface. Examples of the connector for wired connection and the interface circuit include products complying with wired LAN, IEEE 1394, and USB. Examples of the wireless communication interface include products complying with a wireless LAN, and Bluetooth (registered trademark).

The display 14 is a device that displays images and character information. The display 14 displays a variety of images under the control of the processor 11. For example, a variety of display panels, such as a liquid crystal display panel or an organic EL display panel, are used as the display 14 as appropriate. If the XR glasses 20 are connected to the terminal apparatus 10, the display 14 may not be an essential component. In this case, the XR glasses 20 further have the same function as the display 14.

The input device 15 receives an input operation from the user U1 wearing the XR glasses 20 on the head. The input device 15 includes a pointing device, such as a keyboard, a touch pad, a touch panel, or a mouse. If the input device 15 includes a touch panel, the input device 15 may also serve as the display 14.

The inertial sensor 16 detects an inertial force. The inertial sensor 16 includes one or more sensors from among an acceleration sensor, an angular velocity sensor, and a gyro sensor. The processor 11 detects an orientation of the terminal apparatus 10 based on output information of the inertial sensor 16. The processor 11 receives selection of a virtual object VO, input of a character, and input of an instruction in a celestial sphere-shaped virtual space VS based on the orientation of the terminal apparatus 10. For example, when the user U1 operates the input device 15 in a state in which a central axis of the terminal apparatus 10 is directed to a predetermined region of the virtual space VS, the virtual object VO disposed in the predetermined region is selected. The input operation of the user U1 on the input device 15 is, for example, a double tap. In this manner, the user U1 can select the virtual object VO by operating the terminal apparatus 10 without looking at the input device 15 of the terminal apparatus 10.

If the XR glasses 20 are not connected to the terminal apparatus 10, the terminal apparatus 10 preferably includes the same GPS device as the GPS device 24 included in the XR glasses 20.

The processor 11 reads out the control program PR1 from the memory device 12 and executes it, to act as an acquirer 111, a generator 112, a display controller 113, a determiner 114, a movement controller 115, and a receiver 116.

The acquirer 111 acquires a notification from the server 30. If the terminal apparatus 10 is the terminal apparatus 10-1 used by the user U1, the "notification" includes a message to the user U1 from another user U. The "message" includes a mail and a message in an SNS application. The "notification" may include a message from the user U1 to another user U. The "notification" may include a message from another user U to yet another user U. The "notification" may include a message, a warning, or a contact from each application corresponding to the virtual object VO displayed in the virtual space VS. The "notification" may include an advertisement directed to an unspecified number of people.

The "notification" may be a text message or an image. If the "notification" is an image, the "notification" may be a still image or a moving image.

The acquirer 111 acquires the image information indicating the image to be displayed on the XR glasses 20 from the server 30 via the communication device 13. If the image information indicating the image to be displayed on the XR glasses 20 is stored in the memory device 12, the acquirer 111 may acquire the image information from the memory device 12. The acquirer 111 acquires the gaze information, the position information, the orientation information, the motion information, and the image capture information from the XR glasses 20 via the communication device 13.

The generator 112 generates the virtual object VO corresponding to the notification acquired by the acquirer 111. More specifically, the generator 112 generates the virtual object VO corresponding to the notification acquired by the acquirer 111 by using the image information also acquired by the acquirer 111.

The display controller 113 displays the virtual object VO generated by the generator 112 in the virtual space VS in which the user U1 exists. Here, the user U1 is an example of a first user. The "virtual space VS in which the user U1 exists" is a virtual space VS that can be perceived by the user U1 wearing the XR glasses 20.

Figure 5A:
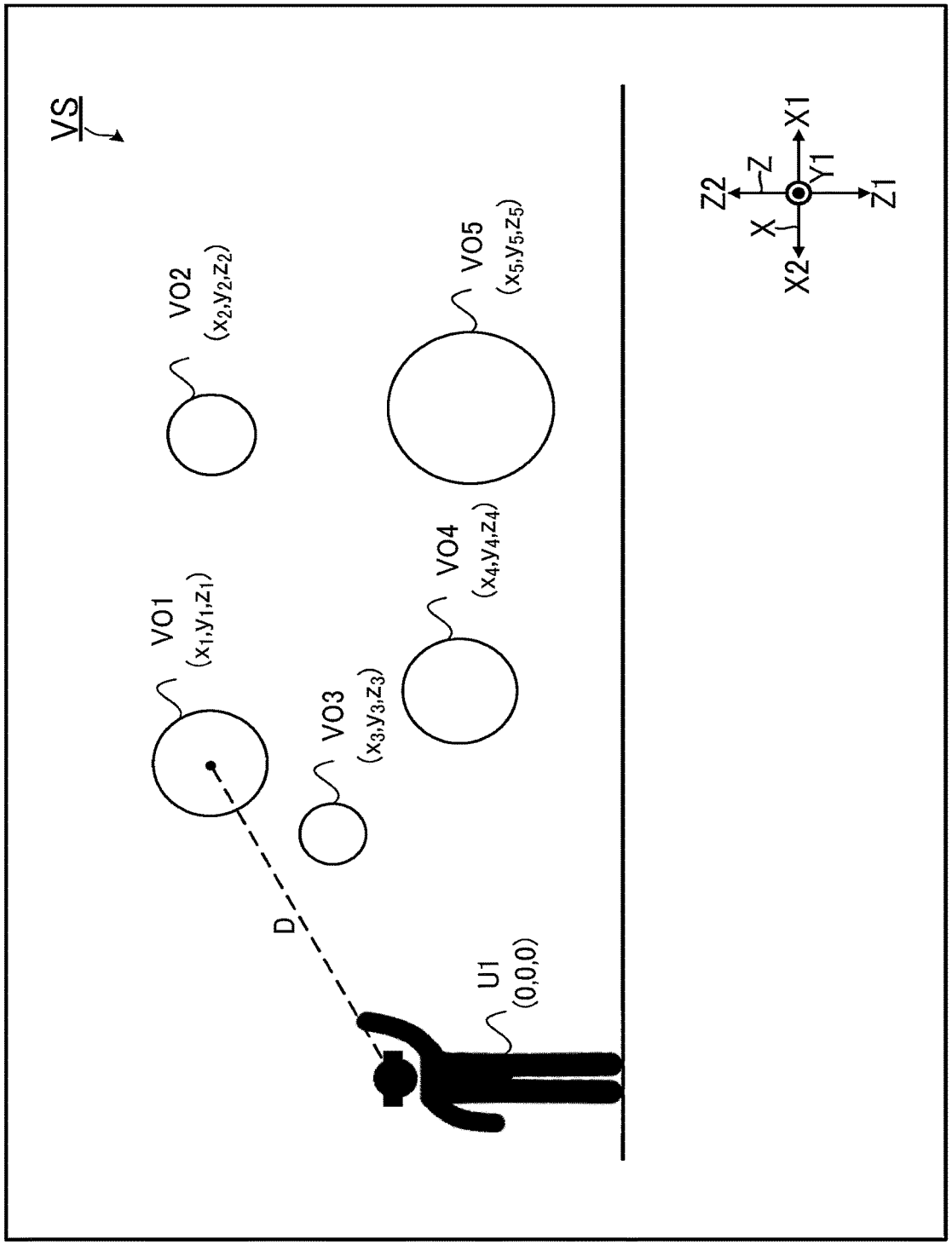
FIG. 5A is an explanatory diagram illustrating an example of operations of a generator 112 and a display controller 113.

FIG. 5A is an explanatory diagram illustrating an example of operations of the generator 112 and the display controller 113. In the following description, the X axis, the Y axis, and the Z axis orthogonal to each other are used in the virtual space VS. As an example, the X axis extends in a front and rear direction of the user U1. When viewed from the user U1, a forward direction along the X axis is defined as an X1 direction, and a rearward direction along the X axis is defined as an X2 direction. The Y axis extends in a left and right direction of the user U1. When viewed by the user U1, a right direction along the Y axis is defined as a Y1 direction, and a left direction along the Y axis is defined as an X2 direction. The X axis and the Y axis constitute a horizontal plane. The Z axis is orthogonal to an XY plane and extends in an upward and downward direction of the user U1. When viewed from the user U1, a downward direction along the Z axis is defined as a Z1 direction, and an upward direction along the Z axis is defined as a Z2 direction.

Referring to FIG. 5A, in the virtual space VS, the user U1 is at coordinates (x, y, z)=(0, 0, 0), which indicate the center of the virtual space VS. The generator 112 generates virtual objects VO1 to VO5 corresponding to the notifications acquired by the acquirer 111. The display controller 113 displays the virtual objects VO1 to VO5 in the virtual space VS. More specifically, the display controller 113 calculates five coordinates from coordinates (x, y, z)=(x1, y1, z1) of the virtual object VO1 to coordinates (x, y, z)=(x5, y5, z5) of the virtual object VO5 in the virtual space VS. Furthermore, the display controller 113 displays the virtual objects VO1 to VO5 at positions indicated by the calculated coordinates. In FIG. 5A, a distance between the coordinates (x, y, z)=(0, 0, 0) of the user U1 and the coordinates (x, y, z)=(x1, y1, z1) of the virtual object VO1 is defined as D.

The display controller 113 may control display forms of the virtual objects VO1 to VO5 based on a recipient of the notification corresponding to each of the virtual objects VO1 to VO5. For example, the display controller 113 may change the color of each of the virtual objects VO1 to VO5 based on whether the number of recipients of the notification corresponding to each of the virtual objects VO1 to VO5 is singular or plural. More specifically, the display controller 113 may change at least one of the hue, the brightness, or the saturation of each of the virtual objects VO1 to VO5 based on whether the number of recipients of the notification corresponding to each of the virtual objects VO1 to VO5 is singular or plural. Alternatively, the display controller 113 may change the transparency of each of the virtual objects VO1 to VO5 based on whether the number of recipients of the notification corresponding to each of the virtual objects VO1 to VO5 is singular or plural. Alternatively, the display controller 113 may change the shape of each of the virtual objects VO1 to VO5 based on whether the number of recipients of the notification corresponding to each of the virtual objects VO1 to VO5 is singular or plural. Alternatively, the display controller 113 may change the size of each of the virtual objects VO1 to VO5 based on the number of recipients of the notification corresponding to each of the virtual objects VO1 to VO5. For example, the display controller 113 may increase the size of each of the virtual objects VO1 to VO5 as the number of recipients of the notification corresponding to each of the virtual objects VO1 to VO5 increases. Increasing the size of the virtual object VO1 means increasing the volume of the virtual object VO1. As long as the volume of the virtual object VO1 increases, the shape of the virtual object VO1 is not necessarily similar before and after the volume changes.

As a result, the user U1 can distinguish the type of recipient of the notification corresponding to the virtual object VO merely by visually recognizing the virtual object VO. Convenience for the user U1 is thereby enhanced.

The display controller 113 may change the display forms of the virtual objects VO1 to VO5 based on the amount of information included in the notification corresponding to each of the virtual objects VO1 to VO5. For example, the display controller 113 may increase the sizes of the virtual objects VO1 to VO5 as the amount of information increases.

As a result, the user U1 can acknowledge the amount of information of the notification corresponding to the virtual object VO only by visually recognizing the virtual object VO. Convenience for the user U1 is thereby enhanced.

The display controller 113 may calculate five sets of coordinates from the coordinates (x, y, z)=(x1, y1, z1) of the virtual object VO1 to the coordinates (x, y, z)=(x5, y5, z5) of the virtual object VO5 based on at least one of a time point when the notification corresponding to each of the virtual objects VO1 to VO5 is acquired by the acquirer 111 or an importance level of the notification corresponding to each of the virtual objects VO1 to VO5. The "importance level of the notification" may be derived by an importance setter (not illustrated) based on a transmission source of each notification. Alternatively, the "importance level of the notification" may be derived based on a result of analyzing a title of each notification or contents of each notification by the importance setter. For example, the display controller 113 may display the virtual object VO of which the timepoint when the notification corresponding to each of the virtual objects VO1 to VO5 is acquired is earlier at a position closer to the user U1. Alternatively, the display controller 113 may display the virtual object VO having a higher importance level of the notification corresponding to each of the virtual objects VO1 to VO5 at a position closer to the user U1.

As a result, the user U1 can preferentially confirm a notification acquired earlier and a notification with a high importance level. Convenience for the user U1 is enhanced.

The display controller 113 may display the virtual objects VO1 to VO5 at positions in the virtual space VS, the positions corresponding to a location in a real space associated with the recipient of the notification acquired by the acquirer 111. For example, when the recipient of the notification acquired by the acquirer 111 is the president of a company, the display controller 113 may display the virtual object VO corresponding to the notification in the president's room of the company in a composite space in which the virtual space VS and the real space are combined.

As a result, the user U1 can confirm that the notification addressed to the user U1 has arrived at a location highly related to the user U1.

When users U are included in the recipient of the notification acquired by the acquirer 111, the display controller 113 may display the virtual object VO at a position in the virtual space VS, the position corresponding to a location in the real space shared by the users U. For example, when all the family members living in a certain house are included in the recipient of the notification acquired by the acquirer 111, the display controller 113 may display the virtual object VO corresponding to the notification in the living room of the house shared by all the family members.

As a result, each user U can confirm that notification of recipients which includes another user U in addition to the user U has arrived at the location shared with the other user U.

In FIG. 5A, as an example, it is envisaged that the virtual objects VO1 to VO5 are spheres, and a text file indicating the contents of the notification is stored in each sphere. However, the shapes of the virtual object VO1 to the virtual object VO5 are not limited to a sphere, and they may be any shape. In FIG. 5A, five virtual objects VO from the virtual object VO1 to the virtual object VO5 are described. However, the number of virtual objects VO is not limited to five, and it may be any number.

Returning to the description of FIG. 4, when the user U1 is included in recipient information indicating one or more recipients of the notification acquired by the acquirer 111, the determiner 114 determines whether a distance between the virtual object VO and the user U1 is equal to or less than a predetermined distance in the virtual space VS. The "predetermined distance" is an example of a first distance.

When the determination result of the determiner 114 is affirmative, the movement controller 115 brings the virtual object VO corresponding to the notification closer to the user U1 in the virtual space VS. In contrast, when the determination result of the determiner 114 is negative, the virtual object VO corresponding to the notification is not moved.

Figure 5B:
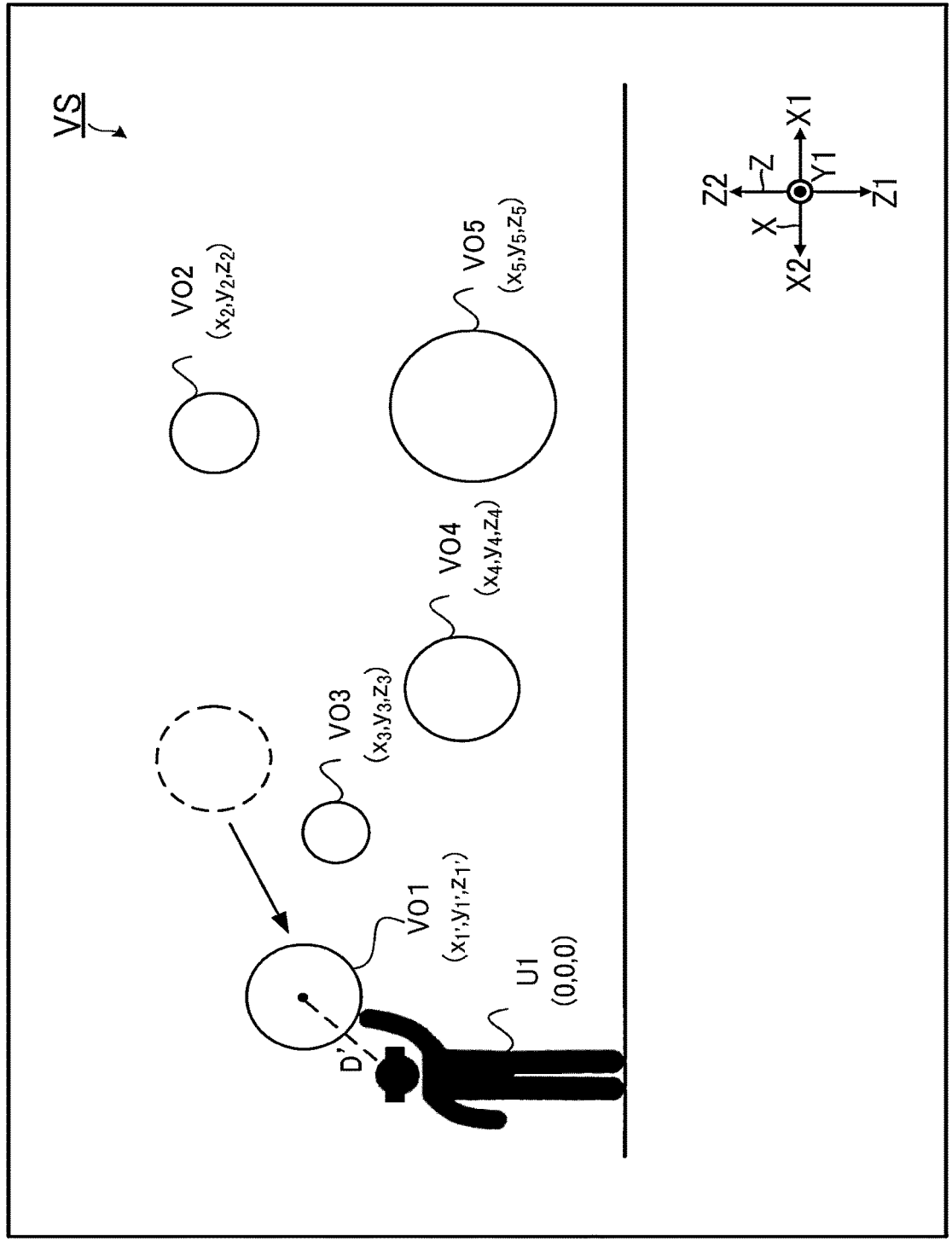
FIG. 5B is an explanatory diagram illustrating an example of the operations of the generator 112 and the display controller 113.

FIGS. 5A and 5B are explanatory diagrams illustrating an example of operations of the determiner 114 and the movement controller 115. At the timepoint in FIG. 5A, it is envisaged that the recipient of the notification corresponding to the virtual object VO1 includes the user U1. Furthermore, it is envisaged that the distance D between the coordinates (x, y, z)=(0, 0, 0) of the user U1 and the coordinates (x, y, z)=(x1, y1, z1) of the virtual object VO1 is equal to or less than the predetermined distance. As a result, the determination result of the determiner 114 is affirmative.

Since the determination result of the determiner 114 is affirmative, in FIG. 5B, the movement controller 115 moves the coordinates of the virtual object VO1 from (x, y, z)=(x1, y1, z1) to (x, y, z)=(x1', y1', z1'). The position of (x, y, z)=(x1', y1', z1') is a position closer to the coordinates (x, y, z)=(0, 0, 0) of the user U1 than (x, y, z)=(x1, y1, z1). In other words, a distance D' between the coordinates (x, y, z)=(0, 0, 0) of the user U1 and the new coordinates (x, y, z)=(x1', y1', z1') of the virtual object VO1 is less than the distance D.

In FIGS. 5A and 5B, the user U1 is not included as the recipient of the notification corresponding to each of the virtual objects VO2 to VO5 other than the virtual object VO1. Alternatively, a distance between the coordinates of the user U1 and the coordinates of each of the virtual objects VO2 to VO5 exceeds the predetermined distance. In such cases, the movement controller 115 does not move the virtual objects VO2 to VO5.

As a result, even when the number of virtual objects VO increases based on the number of notifications, the terminal apparatus 10 can suppress deterioration in convenience for the user U1. Specifically, when the recipient information includes the user U1 and the distance between the virtual object VO corresponding to the notification and the user U1 is equal to or less than the predetermined distance in the virtual space VS, the terminal apparatus 10 brings the virtual object VO closer to the user U1. In short, the user U1 can preferentially confirm the virtual object VO corresponding to the notification the recipient information of which includes the user U1 over other virtual objects VO.

When the notification corresponding to the virtual object VO is an advertisement addressed to an unspecified number of users, the recipient information includes the user U1. Even when the distance between the user U1 and the virtual object VO is equal to or less than the predetermined distance, the movement controller 115 does not necessarily move the virtual object VO.

When moving the virtual object VO1, the movement controller 115 may move the virtual object VO1 in a first mode, when only the user U1 is included in the recipient information indicating one or more recipients of the notification corresponding to the virtual object VO1. When a user U other than the user U1 is included in the recipient information, the movement controller 115 may move the virtual object VO1 in a second mode different from the first mode. For example, when only the user U1 is included in the recipient information, the movement controller 115 may move the virtual object VO1 at a higher speed than when a user U other than the user U1 is included. Alternatively, when only the user U1 is included in the recipient information, the movement controller 115 may move the virtual object VO1 while vibrating the virtual object VO1. When a user U other than the user U1 is included, the movement controller 115 may move the virtual object VO1 without vibrating the virtual object VO1.

As a result, the terminal apparatus 10 can make the notification of the recipient who is the user U1, more appealing to the user U1 than other notifications. Since the user U1 can preferentially confirm the notification of the recipient who is the only user U1, convenience for the user U1 is enhanced.

Returning to the description of FIG. 4, the receiver 116 receives an input operation of the user U1 for the virtual object VO1. When the determination result of the determiner 114 is affirmative as described above, the display controller 113 displays the contents of the notification corresponding to the virtual object VO1 in the virtual space VS in accordance with the input operation received by the receiver 116.

Figure 5C:
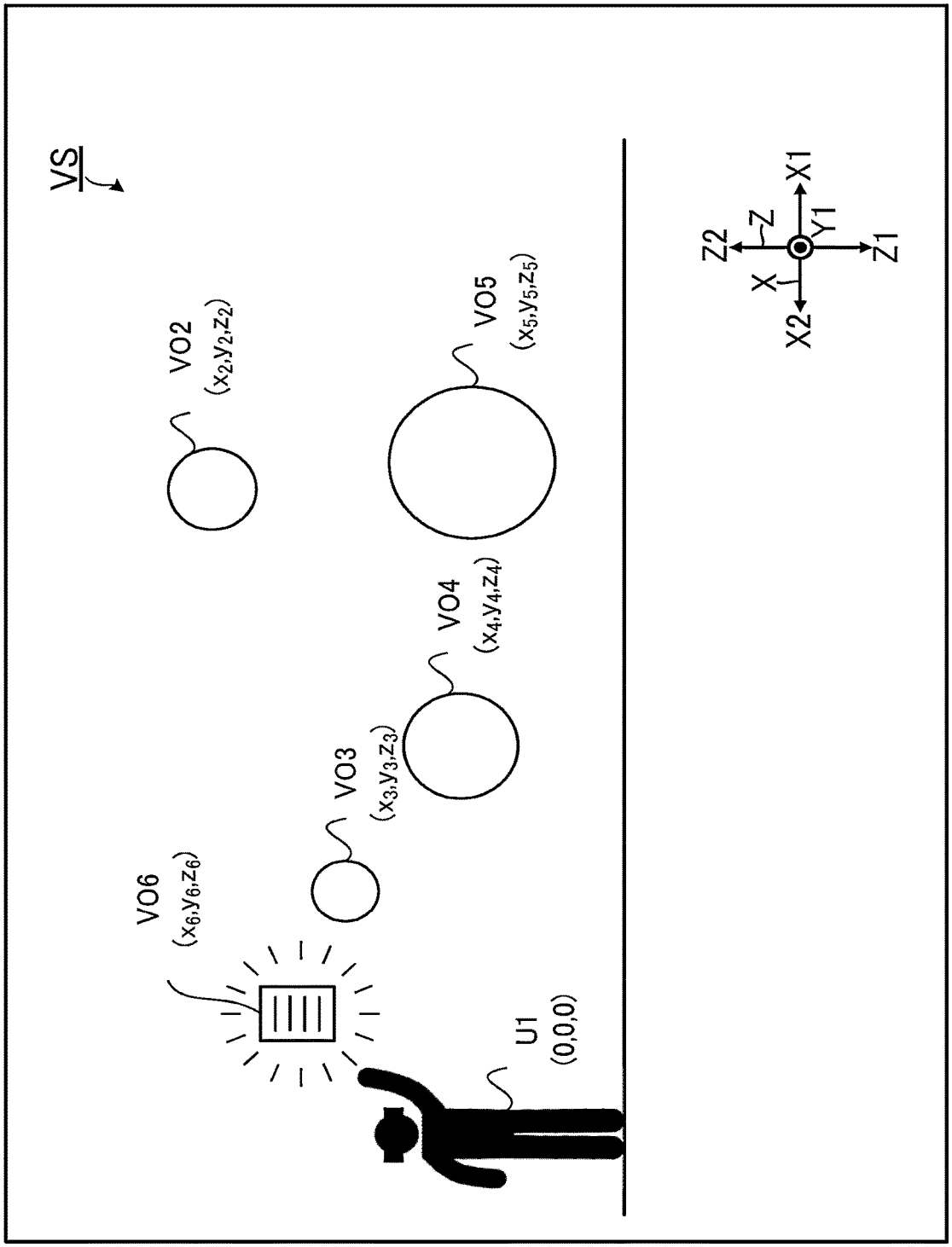
FIG. 5C is an explanatory diagram illustrating an example of operations of the display controller 113 and a receiver 116.

FIG. 5C is an explanatory diagram illustrating an example of operations of the display controller 113 and the receiver 116. In FIG. 5C, the user U1 has come into contact with the virtual object VO1 in the virtual space VS. The receiver 116 receives the touch contact of the user U1 with the virtual object VO1 as the input operation of the user U1 for the virtual object VO1. As described above, the determination result of the determiner 114 is affirmative. Accordingly, in accordance with the input operation, the display controller 113 displays a virtual object VO6 (a text file in which the contents of the notification is described) as an example of the contents of the notification corresponding to the virtual object VO1, at coordinates (x, y, z)=(x6, y6, z6) in the sphere. After displaying the virtual object VO6, the display controller 113 hides the virtual object VO1. The display controller 113 may display the virtual object VO6 after hiding the virtual object VO1, or it may hide the virtual object VO1 and display the virtual object VO6 at the same time. The method for displaying the virtual object VO6 which is a text file is not limited to the method of hiding the sphere as the virtual object VO1. For example, the display controller 113 may apply morphing to transform the virtual object VO1 into the virtual object VO6.

As a result, when the determination result of the determiner 114 is affirmative, the user U1 can confirm the contents of the notification for the virtual object VO. The user U1 can preferentially confirm the contents of the notification by the recipient information which includes the user U1 over other notifications.

In the field of view of the user U1, the virtual object VO and the notification corresponding to the virtual object VO are not displayed at the same time. The field of view of the user U1 becoming unnecessarily narrow does not occur, so that deterioration in convenience for the user U1 is suppressed.

In FIG. 5C, the receiver 116 receives the touch contact of the user U1 with the virtual object VO1 as the input operation of the user U1 for the virtual object VO1. However, the input operation of the user U1 received by the receiver 116 is not limited to the touch contact with the virtual object VO1. For example, the user U1 may direct the user's gaze toward the virtual object VO1. More specifically, based on the gaze information acquired by the terminal apparatus 10 from the XR glasses 20, the receiver 116 may receive, as the input operation of the user U1, the gaze of the user U1 directed toward the virtual object VO1. In this case, when the determination result of the determiner 114 is affirmative and the gaze of the user U1 is directed toward the virtual object VO1 for a predetermined time or more, the display controller 113 displays the contents of the notification corresponding to the virtual object VO1 in the virtual space VS.

As a result, when the determination result of the determiner 114 is affirmative, the user U1 can confirm the contents of the notification corresponding to the virtual object VO only by visually recognizing the virtual object VO for a predetermined time or more. In short, the user U1 can easily confirm the contents of the notification corresponding to the virtual object VO.

In FIGS. 5A to 5C, the user U1 and the virtual objects VO1 to VO5 are two-dimensionally displayed for simplification of description. However, in the actual virtual space VS, the user U1 and the virtual objects VO1 to VO5 are usually three-dimensionally displayed. A method for displaying the user U1 and the virtual objects VO1 to VO5 in the actual virtual space VS is not limited to three-dimensional display, and may be two-dimensional display.

1-1-4: Configuration of Server

Figure 6:
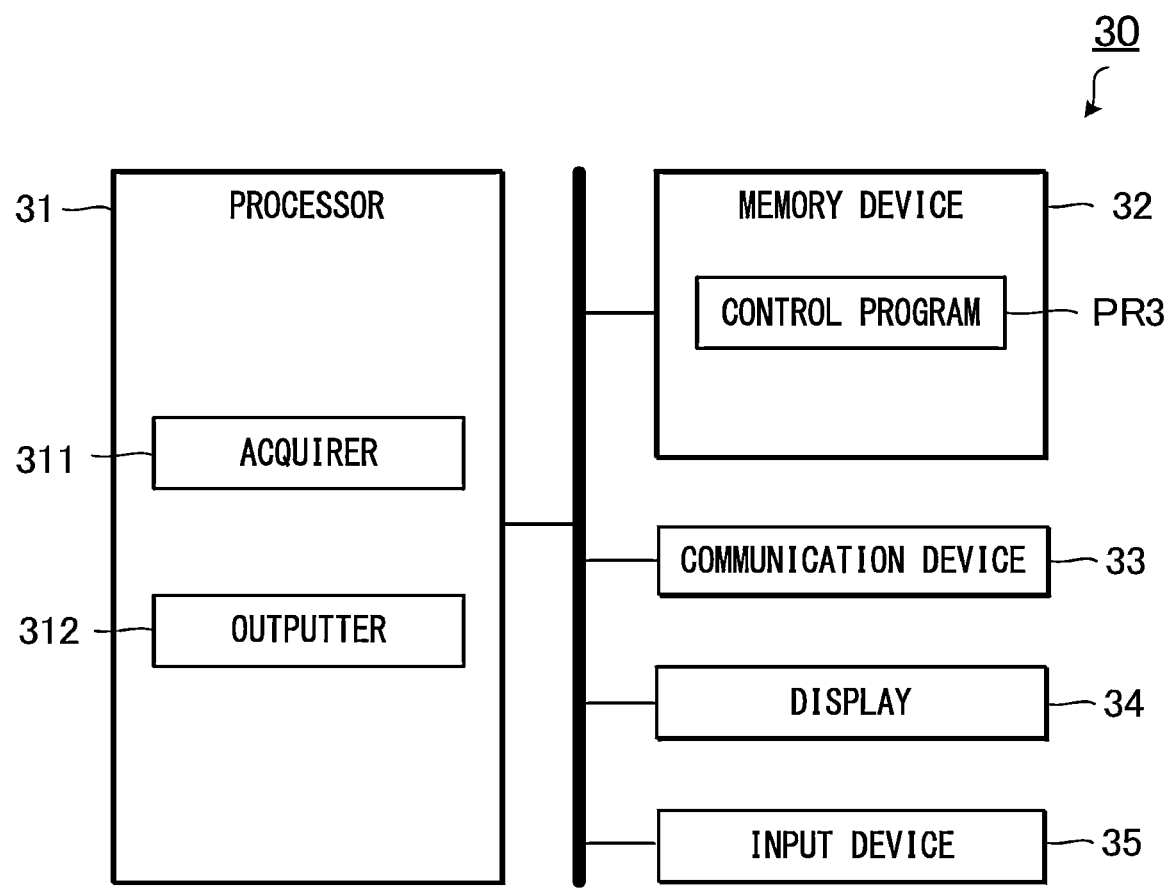
FIG. 6 is a block diagram illustrating an example of a configuration of a server 30 according to the first embodiment.

FIG. 6 is a block diagram illustrating an example of a configuration of the server 30. The server 30 includes a processor 31, a memory device 32, a communication device 33, a display 34, and an input device 35. The elements included in the server 30 are mutually connected by one or more buses for communicating information.

The processor 31 controls the entire server 30. The processor 31 comprises one or more chips. The processor 31 comprises a central processing unit (CPU) including an interface with a peripheral device, an arithmetic device, and a register. One, some, or all of the functions of the processor 31 may be implemented by hardware, such as a DSP, an ASIC, a PLD, or an FPGA. The processor 31 executes a variety of types of processing in parallel or sequentially.

The memory device 32 is a recording medium that is readable from and is writable to by the processor 31. The memory device 32 stores programs including a control program PR3 to be executed by the processor 31. The memory device 32 stores the image information indicating the image to be displayed on the XR glasses 20.

The communication device 33 is hardware, such as a transmission and reception device for communicating with other devices. The communication device 33 is also called a network device, a network controller, a network card, or a communication module. The communication device 33 includes a connector for wired connection, and it may include an interface circuit corresponding to the connector. The communication device 33 may include a wireless communication interface. Examples of the connector for wired connection and the interface circuit include products complying with wired LAN, IEEE 1394, and USB. Examples of the wireless communication interface include products complying with a wireless LAN, and Bluetooth (registered trademark).

The display 34 is a device that displays an image and character information. The display 34 displays a variety of images under the control of the processor 31. For example, a variety of display panels, such as a liquid crystal display panel or an organic EL display panel, are used as the display 34 as appropriate.

The input device 35 is a device that receives an input operation of an administrator of the information processing system 1. For example, the input device 35 includes a pointing device such as a keyboard, a touch pad, a touch panel, or a mouse. If the input device 35 includes a touch panel, the input device 35 may also serve as the display 34.

The processor 31 acts as an acquirer 311 and an outputter 312 by reading the control program PR3 from the memory device 32 and executing the control program PR3.

The acquirer 311 acquires a variety of types of data from the terminal apparatus 10 via the communication device 33. As an example, the data includes data indicating contents of an input operation for the virtual object VO, the data being input to the terminal apparatus 10 by the user U1 wearing the XR glasses 20 on the head.

The outputter 312 transmits the notification to the terminal apparatus 10 via the communication device 33. In particular, when the terminal apparatus 10 is the terminal apparatus 10-1, the outputter 312 transmits the notification addressed to at least the user U1 to the terminal apparatus 10.

The outputter 312 outputs the image information indicating the image to be displayed on the XR glasses 20 to the terminal apparatus 10 via the communication device 33. More specifically, the outputter 312 acquires the image information from the memory device 32. Furthermore, the outputter 312 outputs the acquired image information to the terminal apparatus 10.

1-2: Operation of First Embodiment

Figure 7:
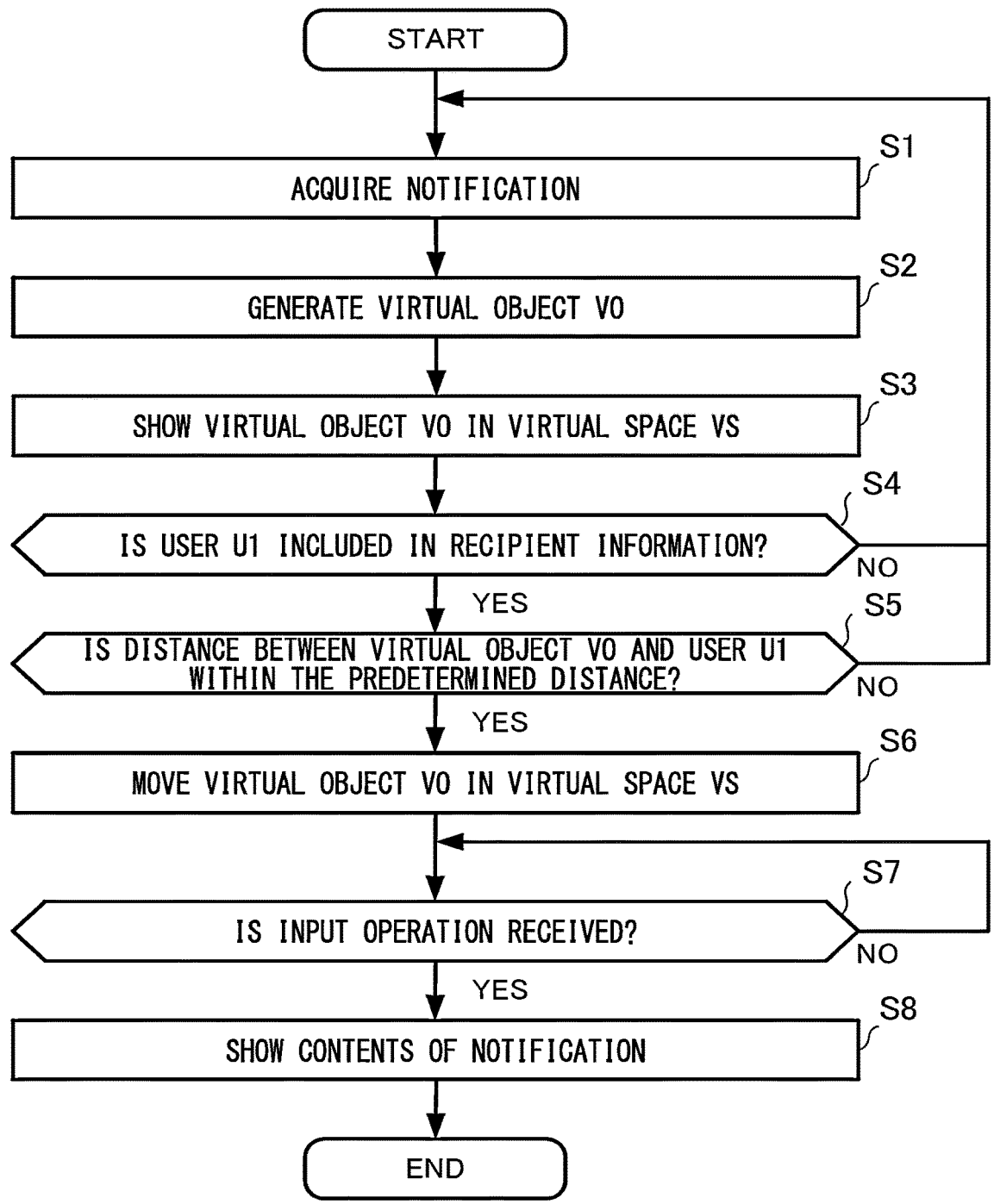
FIG. 7 is a flowchart illustrating an operation of the terminal apparatus 10 according to the first embodiment.

FIG. 7 is a flowchart illustrating an operation of the terminal apparatus 10 according to the first embodiment. Hereinafter, the operation of the terminal apparatus 10 will be described with reference to FIG. 7.

In step S1, the processor 11 acts as the acquirer 111. The processor 11 acquires the notification from the server 30.

In step S2, the processor 11 acts as the generator 112. The processor 11 generates a virtual object VO corresponding to the notification acquired in step S1.

In step S3, the processor 11 acts as the display controller 113. The processor 11 displays the virtual object VO generated in step S2 in the virtual space VS in which the user U1 exists.

In step S4, the processor 11 acts as the determiner 114. The processor 11 determines whether the user U1 is included in the recipient information indicating one or more recipients of the notification acquired in step S1. When the user U1 is included as the recipient of the notification, in other words, when the determination result of the processor 11 is affirmative, the processor 11 executes step S5. When the user U1 is not included in the recipient information, in other words, when the determination result of the processor 11 is negative, the processor 11 executes step S1.

In step S5, the processor 11 acts as the determiner 114. The processor 11 determines whether the distance D between the virtual object VO displayed in step S3 and the user U1 is equal to or less than the predetermined distance in the virtual space VS. When the distance D is equal to or less than the predetermined distance, in other words, when the determination result of the processor 11 is affirmative, the processor 11 executes the operation of step S6. When the distance D exceeds the predetermined distance, in other words, when the determination result of the processor 11 is negative, the processor 11 executes step S1.

In step S6, the processor 11 acts as the movement controller 115. The processor 11 brings the virtual object VO closer to the user U1 in the virtual space VS.

In step S7, the processor 11 acts as the receiver 116. When the processor 11 receives the input operation of the user U1 for the virtual object VO, the processor 11 executes step S8. When the processor 11 has not received the input operation of the user U1 for the virtual object VO, the processor 11 executes step S7.

In step S8, the processor 11 acts as the display controller 113. The processor 11 displays the contents of the notification corresponding to the virtual object VO in the virtual space VS in accordance with the input operation received in step S7. Thereafter, the processor 11 ends all the processing illustrated in FIG. 7.

1-3: Effect of First Embodiment

According to the description, the terminal apparatus 10 as the display control apparatus includes the acquirer 111, the generator 112, the display controller 113, the determiner 114, and the movement controller 115. The acquirer 111 acquires the notification. The generator 112 generates the virtual object VO corresponding to the notification. The display controller 113 displays the virtual object VO in the virtual space VS in which the user U1 as the first user exists. When the user U1 is included in the recipient information indicating one or more recipients of the notification, the determiner 114 determines whether the distance D between the virtual object VO and the user U1 is equal to or less than the predetermined distance in the virtual space VS. The movement controller 115 brings the virtual object VO closer to the user U1, when the determination result of the determiner 114 is affirmative. The movement controller 115 does not move the virtual object VO, when the determination result of the determiner 114 is negative.

The terminal apparatus 10 has the above configuration to display the virtual space VS including the virtual object VO corresponding to the notification on the XR glasses 20. In such a case, even when the number of virtual objects VO increases based on the number of notifications, it is possible to suppress the deterioration in convenience for the user U1.

Specifically, when the user U1 is included as the recipient of the message, and when the distance D between the virtual object VO corresponding to the notification and the user U1 is equal to or less than the predetermined distance in the virtual space VS, the terminal apparatus 10 brings the virtual object VO closer to the user U1. In short, the user U1 can preferentially confirm the virtual object VO corresponding to the notification the recipient of which includes the user U1 over other virtual objects VO. In addition, the terminal apparatus 10 sets, as a condition for bringing the virtual object VO closer to the user U1, that the distance D between the virtual object VO corresponding to the notification and the user U1 is equal to or less than the predetermined distance in the virtual space VS. As a result, the virtual object VO of which the distance to the user U1 is more than the predetermined distance when viewed from the user U1, is not brought closer to the user U1. That is, the virtual object VO of which the distance to the user U1 is more than the predetermined distance does not push out the virtual object VO positioned in the vicinity of the user U1 and suddenly move closer to U1. Confusion does not occur in the field of view of the user U1.

According to the above description, the terminal apparatus 10 further includes the receiver 116. The receiver 116 receives an input operation of the user U1 for the virtual object VO. When the determination result of the determiner 114 is affirmative, the display controller 113 displays the contents of the notification corresponding to the virtual object VO in the virtual space VS in accordance with such an input operation.

Since the terminal apparatus 10 has the above configuration, when the determination result of the determiner 114 is affirmative, the user U1 can confirm the contents of the notification for the virtual object VO. The user U1 can preferentially confirm the contents of the notification the recipient of which includes the user U1 over other notifications.

According to the above description, the input operation for the virtual object VO may be to direct the gaze toward the virtual object VO. In this case, when the determination result of the determiner 114 is affirmative and the gaze is directed toward the virtual object VO for a predetermined time or more, the display controller 113 displays the contents of the notification corresponding to the virtual object VO in the virtual space VS.

Since the terminal apparatus 10 has the above configuration, when the determination result of the determiner 114 is affirmative, the user U1 can confirm the contents of the notification corresponding to the virtual object VO only by visually recognizing the virtual object VO for a predetermined time or more. In short, the user U1 can easily confirm the contents of the notification corresponding to the virtual object VO.

According to the foregoing description, the display controller 113 displays the contents of the notification corresponding to the virtual object VO in the virtual space VS, and then hides the virtual object VO in the virtual space VS.

Since the terminal apparatus 10 has the above configuration, the virtual object VO and the notification corresponding to the virtual object VO are not simultaneously displayed in the field of view of the user U1. As a result, the field of view of the user U1 becoming unnecessarily narrow does not occur, so that deterioration in convenience for the user U1 is suppressed.

According to the above description, the display controller 113 controls the display form of the virtual object VO based on the user U who is the recipient of the notification.

Since the terminal apparatus 10 has the above configuration, the user U1 can distinguish the type of the recipient of the notification corresponding to the virtual object VO only by visually recognizing the virtual object VO. Convenience for the user U1 is enhanced.

According to the above description, when moving the virtual object VO, the movement controller 115 moves the virtual object VO in the first mode, when only the user U1 is included in the recipient information. In contrast, when moving the virtual object VO, the movement controller 115 moves the virtual object VO in the second mode, when a user U other than the user U1 is included in the recipient information.

Since the terminal apparatus 10 has the above configuration, the terminal apparatus 10 can make the notification the recipients, of which there is only the user U1, more appealing to the user U1 than other notifications. Since the user U1 can preferentially confirm the notification the recipient of which is only the user U1, the convenience for the user U1 is enhanced.

According to the above description, the display controller 113 controls a position at which the virtual object VO is displayed in the virtual space VS based on at least one of a timepoint when the acquirer 111 acquires the notification or the importance level of the notification.

Since the terminal apparatus 10 has the above configuration, the user U1 can preferentially confirm, for example, a notification acquired earlier and a notification with a high importance level. Convenience for the user U1 is enhanced.

According to the above description, the display controller 113 displays the virtual object VO at the position in the virtual space VS, the position corresponding to the location in the real space associated with the recipient of the notification.

Since the terminal apparatus 10 has the above configuration, the virtual object VO corresponding to the notification the recipient which includes the user U1 can be displayed at a location highly related to the user U1. As a result, the user U1 can confirm the notification addressed to the user U1 at the location highly related to the user U1.

According to the description, when users U are included in the recipient information, the display controller 113 displays the virtual object VO at a position in the virtual space VS, the position corresponding to a location in the real space shared by the users U.

Since the terminal apparatus 10 has such a configuration, the virtual object VO corresponding to the notification the recipient of which includes the users U is displayed at the location shared by the users U. As a result, each user U can confirm the notification the recipients which includes another user U in addition to the user at the location shared with the other user U.

2: Second Embodiment

With reference to FIGS. 8 to 11A, a configuration will be described of an information processing system 1A including a terminal apparatus 10A as a display control apparatus and a server 30A according to a second embodiment of the present invention. In the following description, for the purpose of simplification of description, the same reference numerals are used for the same components as those of the information processing system 1 according to the first embodiment among components included in the information processing system 1A according to the second embodiment, and description thereof may be omitted.

2-1: Configuration of Second Embodiment

2-1-1: Overall Configuration

The information processing system 1A according to the second embodiment of the present invention is different from the information processing system 1 according to the first embodiment in including the terminal apparatus 10A instead of the terminal apparatus 10 and the server 30A instead of the server 30. In other respects, an overall configuration of the information processing system 1A is the same as the overall configuration of the information processing system 1 according to the first embodiment illustrated in FIG. 1, and thus illustration and description thereof are omitted. The terminal apparatus 10 is an example of the display control apparatus in the first embodiment. However, in the second embodiment, the server 30A is an example of the display control apparatus.

2-1-2: Configuration of Server

Figure 8:
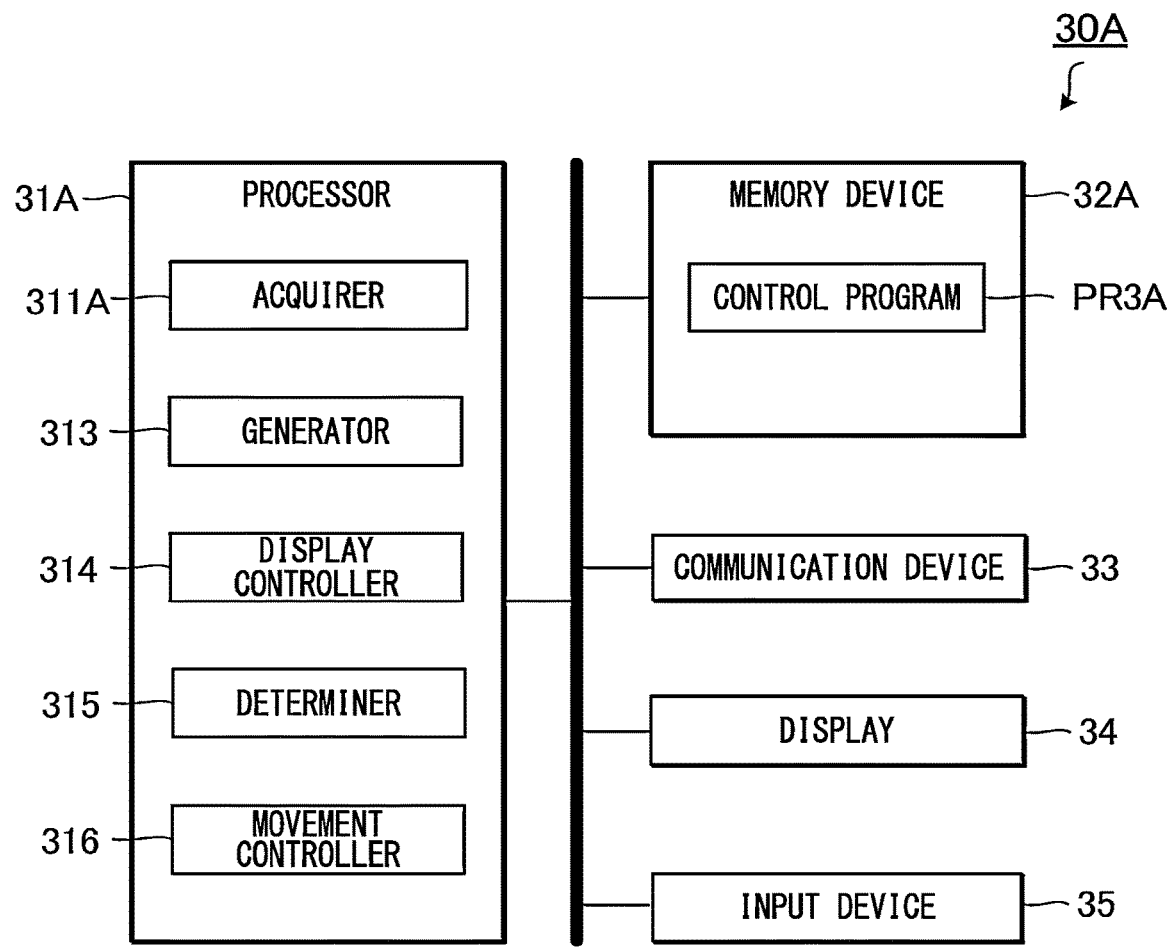
FIG. 8 is a block diagram illustrating an example of a configuration of a server 30A according to a second embodiment.

FIG. 8 is a block diagram illustrating an example of a configuration of the server 30A. Unlike the server 30, the server 30A includes a processor 31A instead of the processor 31 and a memory device 32A instead of the memory device 32.

Unlike the memory device 32, the memory device 32A stores a control program PR3A instead of the control program PR3.

The processor 31A includes an acquirer 311A instead of the acquirer 311 included in the processor 31. Unlike the processor 31, the processor 31A does not include the outputter 312 as an essential component. The processor 31A includes a generator 313, a display controller 314, a determiner 315, and a movement controller 316 in addition to the components included in the processor 31.

The acquirer 311A acquires a variety of types of data from a terminal apparatus 10 via a communication device 33 in the same way as the acquirer 311. As an example, the data includes data indicating contents of an input operation for a virtual object VO, the data being input to the terminal apparatus 10 by a user U1 wearing XR glasses 20 on the head.

The acquirer 311A acquires a notification in the same way as the acquirer 111 included in the terminal apparatus 10 according to the first embodiment. The "notification" includes a message to at least one of the user U1 or a user U2 from another user U. The "message" includes, for example, a mail and a message in an SNS application. The "notification" may include a message from one of the user U1 and the user U2 to another user U. The "notification" may include a message from another user U to yet another user U. The "notification" may include a message, for example, a warning or a contact from each application corresponding to the virtual object VO displayed in the virtual space VS. The "notification" may include an advertisement directed to an unspecified number of people.

When the notification is stored in the memory device 32A, the acquirer 311A acquires the notification from the memory device 32A. Alternatively, the acquirer 311A may acquire the notification from another device different from the server 30A, for example, a mail server.

The acquirer 311A acquires, from the terminal apparatus 10A via the communication device 33, an input operation of the user U1 for a virtual object VO1 received by a receiver 116 included in the terminal apparatus 10A.

The generator 313 generates the virtual object VO corresponding to the notification acquired by the acquirer 311A in the same way as the generator 112 is included in the terminal apparatus 10 according to the first embodiment. More specifically, the generator 313 generates the virtual object VO corresponding to the notification acquired by the acquirer 311A by using image information stored in the memory device 32A.

The display controller 314 displays the virtual object VO generated by the generator 313 in each of the following: a virtual space VS1 in which the user U1 exists, and a virtual space VS2 in which the user U2 exists. The user U1 is at coordinates (x, y, z)=(0, 0, 0), which indicate the center of the virtual space VS1. Similarly, the user U2 is positioned at coordinates (x, y, z)=(0, 0, 0), which indicate the center of the virtual space VS2. The user U1 is an example of a first user. In addition, the user U2 is an example of a second user. The virtual space VS1 is an example of a first virtual space. The virtual space VS2 is an example of a second virtual space.

Figure 9:
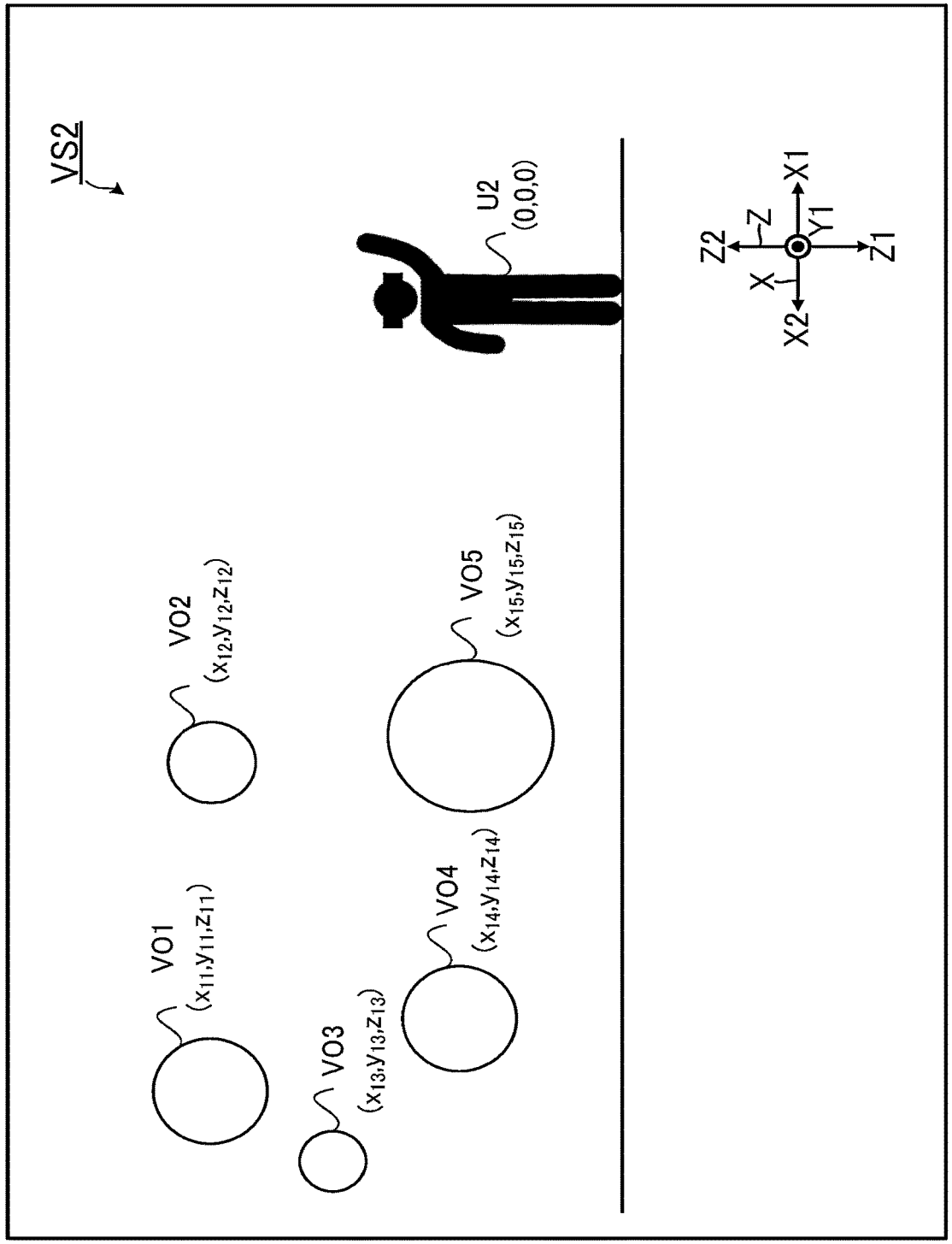
FIG. 9 is an explanatory diagram illustrating an example of operations of a generator 313 and a display controller 314.

FIG. 9 is an explanatory diagram illustrating an example of operations of the generator 313 and the display controller 314. In FIG. 9, the user U2 wears XR glasses connected to a terminal apparatus 10A-2 on the head. The display controller 314 displays virtual objects VO1 to VO5 in the virtual space VS1 in the same way as the operation of the display controller 113 provided in the terminal apparatus 10 according to the first embodiment illustrated in FIG. 5A. More specifically, the display controller 314 outputs the image information indicating images of the virtual objects VO1 to VO5 generated by the generator 313 to a terminal apparatus 10A-1 via the communication device 33. The display controller 314 outputs control information including coordinate information indicating five sets of coordinates from coordinates (x, y, z)=(x1, y1, z1) of the virtual object VO1 to coordinates (x, y, z)=(x5, y5, z5) of the virtual object VO5 to the terminal apparatus 10A-1 via the communication device 33. A display controller 113A described below included in the terminal apparatus 10A-1 displays the virtual objects VO1 to VO5 in the virtual space VS1 based on the image information indicating the images of the virtual objects VO1 to VO5 acquired from the server 30A and the coordinate information indicating five sets of coordinates from the coordinates (x, y, z)=(x1, y1, z1) of the virtual object VO1 to the coordinates (x, y, z)=(x5, y5, z5) of the virtual object VO5.

As shown in FIG. 9, the display controller 314 displays the virtual objects VO1 to VO5 in the virtual space VS2. More specifically, the display controller 314 calculates five sets of coordinates from coordinates (x, y, z)=(x11, y11, z11) of the virtual object VO1 to coordinates (x, y, z)=(x15, y15, z15) of the virtual object VO5 in the virtual space VS2. In addition, the display controller 113 displays the virtual objects VO1 to VO5 at positions indicated by the calculated coordinates. More specifically, the display controller 314 transmits the image information indicating the images of the virtual objects VO1 to VO5 generated by the generator 313 to the terminal apparatus 10A-2 via the communication device 33. The display controller 314 transmits control information including coordinate information indicating five sets of coordinates from the coordinates (x, y, z)=(x11, y11, z11) of the virtual object VO1 to the coordinates (x, y, z)=(x15, y15, z15) of the virtual object VO5 to the terminal apparatus 10A-2 via the communication device 33. The display controller 113A (described below) included in the terminal apparatus 10A-2 displays the virtual objects VO1 to VO5 in the virtual space VS2 based on the image information indicating the images of the virtual objects VO1 to VO5 acquired from the server 30A and the coordinate information indicating five sets of coordinates from the coordinates (x, y, z)=(x11, y11, z11) of the virtual object VO1 to the coordinates (x, y, z)=(x15, y15, z15) of the virtual object VO5.

The coordinates (x, y, z)=(x11, y11, z11) of the virtual object VO1 in the virtual space VS2 may be the same as or different from the coordinates (x, y, z)=(x1, y1, z1) of the virtual object VO1 in the virtual space VS1. Similarly, each of the coordinates (x, y, z)=(x12, y12, z12) of the virtual object VO2 to the coordinates (x, y, z)=(x15, y15, z15) of the virtual object VO5 in the virtual space VS2 may be the same as or different from each of the coordinates (x, y, z)=(x2, y2, z2) of the virtual object VO2 to the coordinates (x, y, z)=(x5, y5, z5) of the virtual object VO5 in the virtual space VS1.

Returning to the description of FIG. 8, when the user U1 is included in recipient information indicating one or more recipients of the notification acquired by the acquirer 311A, the determiner 315 determines whether a distance D between the virtual object VO and the user U1 is equal to or less than a predetermined distance in the virtual space VS1 in the same way as the determiner 114 included in the terminal apparatus 10 according to the first embodiment.

When the determination result of the determiner 315 is affirmative, the movement controller 316 brings the virtual object VO corresponding to the notification closer to the user U1 in the virtual space VS1 in the same way as the movement controller 115 included in the terminal apparatus 10 according to the first embodiment. In contrast, when the determination result of the determiner 315 is negative, the virtual object VO corresponding to the notification is not moved. The operation example of the movement controller 316 is the same as the operation example of the movement controller 115 illustrated in FIG. 5B.

When the determination result of the determiner 315 is affirmative, the display controller 314 displays contents of the notification corresponding to the virtual object VO1 in the virtual space VS1 in accordance with the input operation acquired by the acquirer 311A. For example, the display controller 314 displays, in the virtual space VS1, a virtual object VO6, which is a text file in which the contents of the notification is described, as an example of the contents of the notification corresponding to the virtual object VO1, at (x, y, z)=(x6, y6, z6), which are coordinates in the sphere, in the same way as the operation example of the display controller 113 illustrated in FIG. 5C. The display controller 314 displays the virtual object VO6 in the virtual space VS1, and then hides the virtual object VO1.

As a result, even when the number of virtual objects VO increases based on the number of notifications, the server 30A can suppress deterioration in convenience for the user U1. Specifically, when the user U1 is included as the recipient of the message and a distance between the virtual object VO corresponding to the notification and the user U1 is equal to or less than the predetermined distance in the virtual space VS1, the server 30A brings the virtual object VO closer to the user U1. As a result, the user U1 can preferentially confirm the virtual object VO corresponding to the notification the recipient of which includes the user U1 over other virtual objects VO.

The display controller 314 continues to display the virtual object VO1 until the contents of the notification corresponding to the virtual object VO1 (e.g., the virtual object VO6 is displayed) in the virtual space VS2. That is, even after the virtual object VO1 is hidden in the virtual space VS1, the display controller 314 continues to display the virtual object VO1 in the virtual space VS2 until the user U2 confirms the contents of the notification corresponding to the virtual object VO1 in the virtual space VS2.

As a result, even when the user U1 confirms the contents of the notification in the virtual space VS1 and the virtual object VO is thus hidden, the contents of the notification corresponding to the virtual object VO does not suddenly appear in the virtual space VS2 in which the user U2 exists. The user U2 is not confused by the appearance.

When the coordinates (x, y, z)=(x11, y11, z11) of the virtual object VO1 in the virtual space VS2 are the same as the coordinates (x, y, z)=(x1, y1, z1) of the virtual object VO1 in the virtual space VS1, the movement controller 316 may move the virtual object VO1 in the virtual space VS2 on the same movement route as the virtual object VO1 in the virtual space VS1.

2-1-3: Configuration of Terminal Apparatus

Figure 10:
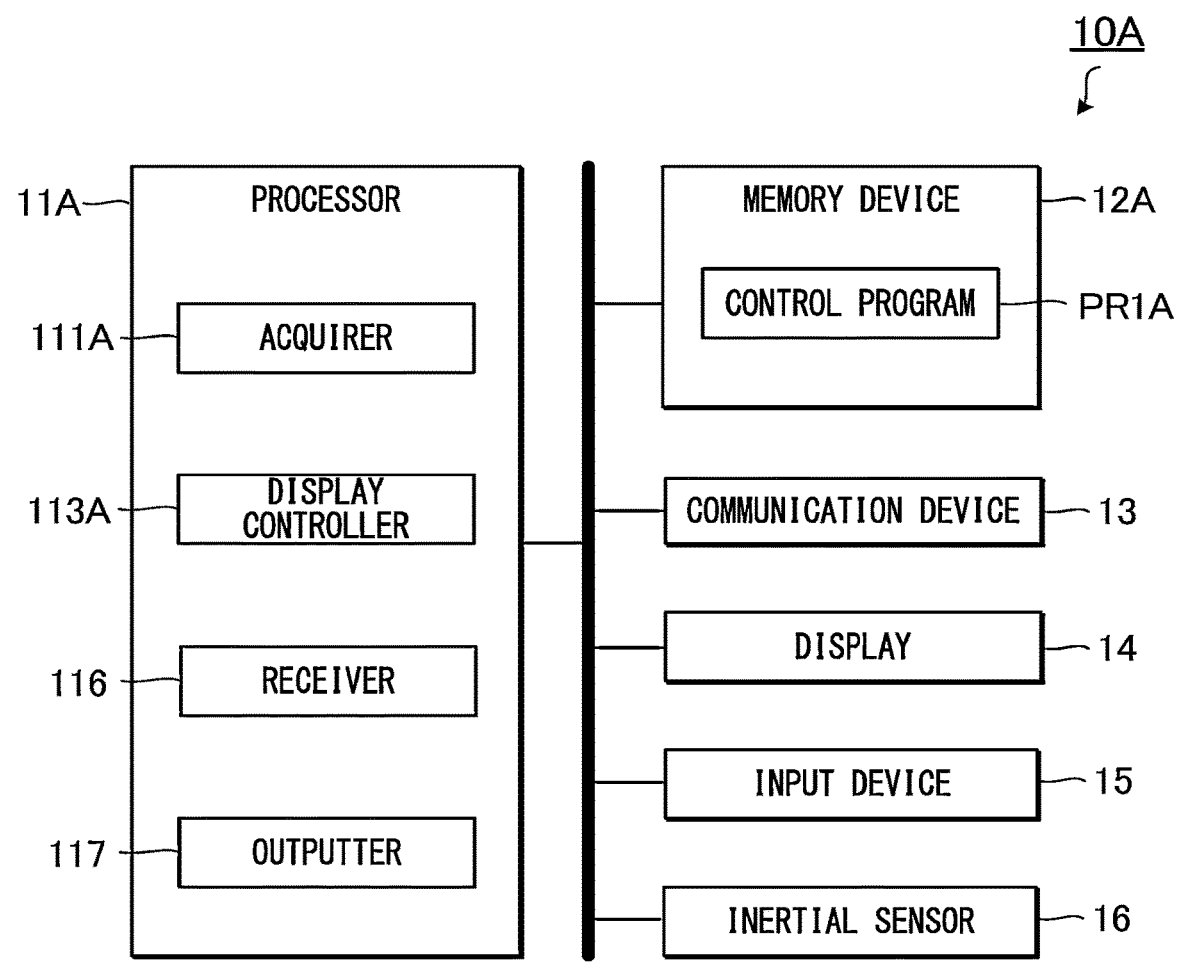
FIG. 10 is a block diagram illustrating an example of a configuration of a terminal apparatus 10A according to the second embodiment.

FIG. 10 is a block diagram illustrating an example of a configuration of the terminal apparatus 10A. Unlike the terminal apparatus 10, the terminal apparatus 10A includes a processor 11A instead of the processor 11 and a memory device 12A instead of the memory device 12.

Unlike the memory device 12, the memory device 12A stores a control program PR1A instead of the control program PR1.

The processor 11A includes an acquirer 111A instead of the acquirer 111 included in the processor 11, and a display controller 113A instead of the display controller 113. Unlike the processor 11, the processor 11A does not include the generator 112 as an essential component. The processor 11A includes an outputter 117 in addition to the components included in the processor 11.

The acquirer 111A acquires gaze information, position information, orientation information, motion information, and image capture information from the XR glasses 20 via a communication device 13 in the same way as the acquirer 111 included in the terminal apparatus 10 according to the first embodiment.

The acquirer 111A acquires image information indicating an image to be displayed on the XR glasses 20 from the server 30A. In particular, the acquirer 111A acquires image information indicating images of the virtual objects VO1 to VO5 from the server 30A. The acquirer 111A acquires the coordinate information indicating the coordinates of the virtual objects VO1 to VO5 in the virtual space VS from the server 30A. More specifically, when the terminal apparatus 10A is the terminal apparatus 10A-1, the acquirer 111A acquires, from the server 30A, the coordinate information indicating five sets of coordinates from the coordinates (x, y, z)=(x1, y1, z1) of the virtual object VO1 to the coordinates (x, y, z)=(x5, y5, z5) of the virtual object VO5. In contrast, when the terminal apparatus 10A is the terminal apparatus 10A-2, the acquirer 111A acquires, from the server 30A, the coordinate information indicating five sets of coordinates from the coordinates (x, y, z)=(x11, y11, z11) of the virtual object VO1 to the coordinates (x, y, z)=(x15, y15, z15) of the virtual object VO5.

The display controller 113A displays the virtual objects VO1 to VO5 in the virtual space VS based on the image information indicating the images of the virtual objects VO1 to VO5 and the coordinate information indicating five sets of coordinates from the coordinates of the virtual object VO1 to the coordinates of the virtual object VO5 acquired by the acquirer 111A. More specifically, when the terminal apparatus 10A is the terminal apparatus 10A-1, the display controller 113A displays the virtual objects VO1 to VO5 in the virtual space VS1 based on the image information indicating the images of the virtual objects VO1 to VO5 and the coordinate information indicating five sets of coordinates from the coordinates (x, y, z)=(x1, y1, z1) of the virtual object VO1 to the coordinates (x, y, z)=(x5, y5, z5) of the virtual object VO5. In contrast, when the terminal apparatus 10A is the terminal apparatus 10A-2, the display controller 113A displays the virtual objects VO1 to VO5 in the virtual space VS2 based on the image information indicating the images of the virtual objects VO1 to VO5 and the coordinate information indicating five sets of coordinates from the coordinates (x, y, z)=(x11, y11, z11) of the virtual object VO1 to the coordinates (x, y, z)=(x15, y15, z15) of the virtual object VO5.

The outputter 117 outputs the input operation of the user U1 for the virtual object VO1 received by the receiver 116 to the server 30A via the communication device 13.

2-2: Operation of Second Embodiment

Figure 11:
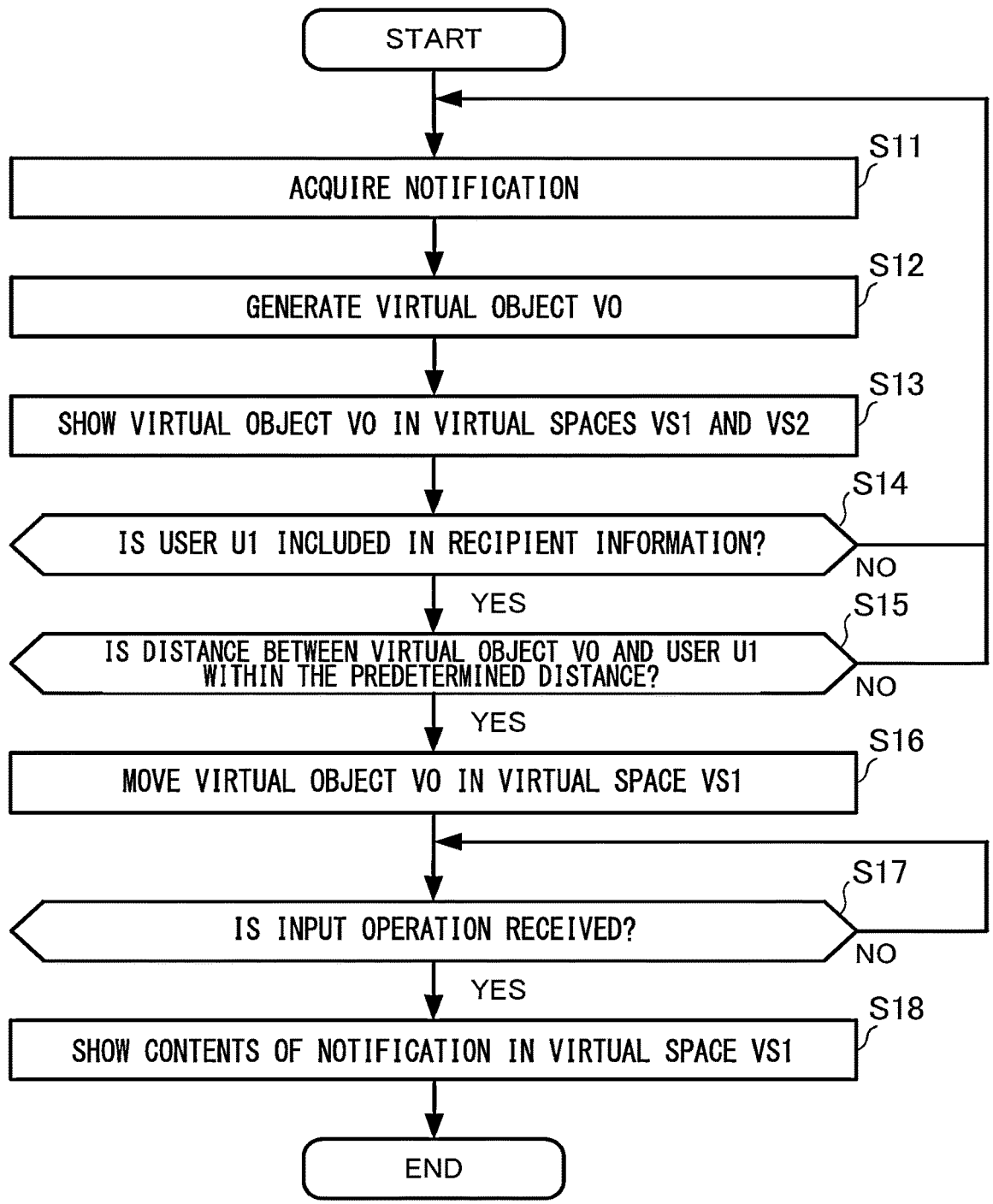
FIG. 11 is a flowchart illustrating an operation of the server 30A according to the second embodiment.

FIG. 11 is a flowchart illustrating an operation of the server 30A according to the second embodiment. The operation of the server 30A will be described with reference to FIG. 11.

In step S11, the processor 31A acts as the acquirer 311A. The processor 31A acquires the notification.

In step S12, the processor 31A acts as the generator 313. The processor 31A generates the virtual object VO corresponding to the notification acquired in step S12.

In step S13, the processor 31A acts as the display controller 314. The processor 31A displays the virtual object VO generated in step S12 in the virtual space VS1 in which the user U1 exists and the virtual space VS2 in which the user U2 exists.

In step S14, the processor 31A acts as the determiner 315. The processor 31A determines whether the user U1 is included in the recipient information indicating one or more recipients of the notification acquired in step S11. When the user U1 is included in the recipient information, in other words, when the determination result of the processor 31A is affirmative, the processor 31A executes step S15. When the user U1 is not included in the recipient information, that is, when the determination result of the processor 31A is negative, the processor 31A executes step S1.

In step S15, the processor 31A acts as the determiner 315. The processor 31A determines whether or not the distance D between the virtual object VO displayed in step S13 and the user U1 is equal to or less than the predetermined distance in the virtual space VS1. When the distance D is equal to or less than the predetermined distance, in other words, when the determination result of the processor 31A is affirmative, the processor 31A executes step S16. When the distance D exceeds the predetermined distance, in other words, when the determination result of the processor 31A is negative, the processor 31A executes step S11.

In step S16, the processor 31A acts as the movement controller 316. The processor 31A moves the virtual object VO in the virtual space VS1 to bring the virtual object VO closer to the user U1.

In step S17, the processor 31A acts as the acquirer 311A. When the processor 31A acquires the input operation of the user U1 for the virtual object VO in the virtual space VS1, the processor 31A executes step S18. When the processor 31A has not received the input operation of the user U1 for the virtual object VO in the virtual space VS1, the processor 31A executes the processing of step S17.

In step S18, the processor 31A acts as the display controller 314. The processor 31A displays the contents of the notification corresponding to the virtual object VO in the virtual space VS1 in accordance with the input operation acquired in step S17. The processor 31A continues to display the virtual object VO in the virtual space VS2 until the contents of the notification corresponding to the virtual object VO is displayed in the virtual space VS2. Thereafter, the processor 31A ends all the processing illustrated in FIG. 11.

2-3: Effect of Second Embodiment

According to the above description, the server 30A as the display control apparatus includes the acquirer 311A, the generator 313, the display controller 314, the determiner 315, and the movement controller 316. The acquirer 311A acquires the notification. The generator 313 generates the virtual object VO corresponding to the notification. The display controller 314 displays the virtual object VO in the virtual space VS1 as the first virtual space in which the user U1 as the first user exists and the virtual space VS2 as the second virtual space in which the user U2 as the second user exists. When the user U1 is included in the recipient information indicating one or more recipients of the notification, the determiner 315 determines whether the distance D between the virtual object VO and the user U1 is equal to or less than the predetermined distance in the virtual space VS1. The movement controller 316 brings the virtual object VO closer to the user U1 in the virtual space VS1 when the determination result of the determiner 315 is affirmative. The movement controller 316 does not move the virtual object VO in the virtual space VS1 when the result of the determiner 315 is negative. The display controller 314 displays the contents of the notification corresponding to the virtual object VO in the virtual space VS1, and then hides the virtual object VO in the virtual space VS1. The display controller 314 continues to display the virtual object VO in the virtual space VS2 until the contents of the notification corresponding to the virtual object VO is displayed in the virtual space VS2.

The server 30A has the above configuration to display the virtual space VS including the virtual object VO corresponding to the notification on the XR glasses 20. In such a case, even when the number of virtual objects VO increases based on the number of notifications, it is possible to suppress the deterioration in convenience for the user U1. Specifically, when the recipient information includes the user U1 and the distance D between the virtual object VO corresponding to the notification and the user U1 is equal to or less than the predetermined distance in the virtual space VS1, the terminal apparatus 10 brings the virtual object VO closer to the user U1. As a result, the user U1 can preferentially confirm the virtual object VO corresponding to the notification the recipient information of which includes the user U1 over other virtual objects VO. Furthermore, the terminal apparatus 10 brings the virtual object VO closer to the user U1 only when the distance D between the virtual object VO corresponding to the notification and the user U1 is equal to or less than the predetermined distance. As a result, the virtual object VO of which the distance to the user U1 is more than the predetermined distance when viewed by the user U1 is not brought closer to the user U1. That is, the virtual object VO of which the distance to the user U1 is greater than the predetermined distance, does not push the virtual object VO positioned in the vicinity of the user U1 and suddenly move it closer to U1. Confusion does not occur in the field of view of the user U1.

Even when the server 30A hides the virtual object VO in the virtual space VS1, the server 30A does not hide the virtual object VO in the virtual space VS2 until the contents of the notification corresponding to the virtual object VO is displayed. As a result, even when the user U1 confirms the contents of the notification in the virtual space VS1 and the virtual object VO is thus hidden, the contents of the notification corresponding to the virtual object VO does not suddenly appear in the virtual space VS2 in which the user U2 exists. In short, the user U2 is not confused by the appearance.

3: Modifications

The present disclosure is not limited to the foregoing embodiments. Specific modifications are exemplified below. Two or more aspects freely selected from the following examples may be combined.

3-1: First Modification

In the information processing system 1 according to the first embodiment, the terminal apparatus 10 and the XR glasses 20 are implemented as separate bodies. However, a method for implementing the terminal apparatus 10 and the XR glasses 20 in the embodiment of the present invention is not limited thereto. For example, the XR glasses 20 may have the same function as the terminal apparatus 10, and the terminal apparatus 10 and the XR glasses 20 may be implemented in a single housing. The same applies to the information processing system 1A according to the second embodiment.

3-2: Second Modification

The information processing system 1 according to the first embodiment includes the XR glasses 20. In the description, when the XR glasses 20 are MR glasses has been described as an example. However, in the information processing system 1, the XR glasses 20 may be any one of a head mounted display (HMD) employing a virtual reality (VR) technology, VR glasses employing the VR technology, an HMD employing an augmented reality (AR) technology, AR glasses employing the AR technology, and an HMD employing an MR technology, instead of the MR glasses. Alternatively, the information processing system 1 may include any one of a normal smartphone and a tablet including an image capture device instead of the XR glasses 20 that are the MR glasses. The HMD, the VR glasses, the AR glasses, the smartphone, and the tablet are examples of the display device. The same applies to the information processing system 1A according to the second embodiment.

4: Other Matters (1) In the foregoing embodiments, a read only memory (ROM) and a random access memory (RAM) are exemplified as the memory devices 12 and 12A, the memory device 22, and the memory devices 32 and 32A, but the memory devices 12 and 12A, the memory device 22, and the memory devices 32 and 32A are flexible disks, magneto-optical disks (for example, compact discs, digital versatile discs, or Blu-ray (registered trademark) discs), smart cards, flash memory devices (for example, cards, sticks, or key drives), compact disc-ROMs (CD-ROMs), registers, removable disks, hard-disks, floppy (registered trademark) disks, magnetic strips, databases, servers, or other appropriate storage media. The program may be transmitted from a network via an electric communication line. The program may be transmitted from the communication network NET via the electric communication line.

(2) In the foregoing embodiments, the described information, signals, and the like may be represented using any of a variety of different technologies. For example, data, instructions, commands, information, signals, bits, symbols, chips, and the like that may be mentioned throughout the above description may be represented by voltages, currents, electromagnetic waves, magnetic fields or particles, optical fields or photons, or any combination thereof.

(3) In the foregoing embodiments, the input/output information and the like may be stored in a specific location (for example, a memory) or may be managed using a management table. The input/output information and the like can be overwritten, updated, or additionally written. The output information and the like may be deleted. The input information and the like may be transmitted to another device.

(4) In the foregoing embodiments, the determination may be performed using a value (0 or 1) represented by using one bit, may be performed using a Boolean value (true or false), or may be performed by comparison of numerical values (for example, comparison with a predetermined value).

(5) The order of the processing procedure, sequence, flowchart, and the like illustrated in the embodiments described above may be changed as long as there is no contradiction. For example, for the methods described in the present disclosure, elements of various steps are presented using an example order, and are not limited to the particular order presented.

(6) Each function illustrated in FIGS. 1 to 11 is implemented by an arbitrary combination of at least one of hardware or software. A method for implementing each functional block is not particularly limited. That is, each functional block may be implemented by using one physically or logically combined device, or may be implemented by directly or indirectly (for example, in a wired or wireless manner) connecting two or more physically or logically separated devices and using the devices. The functional block may be implemented by combining software with the one or more devices.

(7) The program exemplified in the embodiments described above should be interpreted broadly to mean an instruction, an instruction set, a code, a code segment, a program code, a program, a subprogram, a software module, an application, a software application, a software package, a routine, a subroutine, an object, an executable file, an execution thread, a procedure, a function, or the like, regardless of whether the program is referred to as software, firmware, middleware, microcode, or a hardware description language, or referred to by another name.

Software, instructions, information, and the like may be transmitted and received via a transmission medium. For example, when software is transmitted from a website, server, or other remote source using at least one of a wired technology (a coaxial cable, an optical fiber cable, a twisted pair, a digital subscriber line (DSL), or the like) or a wireless technology (infrared rays, microwaves, or the like), at least one of the wired technology or the wireless technology is included within the definition of the transmission medium.

(8) In the foregoing embodiments, the terms "system" and "network" are used interchangeably.

(9) The information, the parameter, or the like described in the present disclosure may be represented by using an absolute value, may be represented by using a relative value from a predetermined value, or may be represented by using another corresponding information.

(10) In the foregoing embodiments, the terminal apparatus 10 and 10A and the server 30 and 30A are mobile stations (MS). The mobile station may also be referred to by those skilled in the art as a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable term. In the present disclosure, the terms such as "mobile station", "user terminal", "user equipment (UE)", and "terminal" can be used interchangeably.

(11) In the foregoing embodiments, the terms "connected", "coupled", or any variation thereof, mean any direct or indirect connection or coupling between two or more elements, including the presence of one or more intermediate elements between two elements that are "connected" or "coupled" to each other. The coupling or connection between the elements may be physical coupling or connection, logical coupling or connection, or a combination thereof. For example, "connection" may also be read as "access". When used in the present disclosure, two elements may be "connected" or "coupled" to each other using at least one of one or more wires, cables, or printed electrical connections, and using electromagnetic energy having a wavelength in a radio frequency region, a microwave region, and a light (both visible and invisible) region, and the like as some non-limiting and non-exhaustive examples.

(12) In the foregoing embodiments, the phrase "based on" does not mean "based only on" unless explicitly stated otherwise. In other words, the phrase "based on" means both "based only on" and "based at least on".

(13) The term "determining" used in the present disclosure may encompass a wide variety of operations. The term "determining" can include, for example, judging, calculating, computing, processing, deriving, investigating, looking up, searching, inquiring (for example, looking up in a table, a database, or another data structure), and ascertaining that can be considered as "determining". The "determining" can include receiving (for example, receiving information), transmitting (for example, transmitting information), inputting, outputting, and accessing (for example, accessing data in a memory) that can be considered as "determining". The "determining" can include resolving, selecting, choosing, establishing, and comparing that can be considered as "determining". That is, "determining" can include any operation that can be considered as "determining". The "determining" may be read as "assuming", "expecting", "considering", or the like.

(14) In the foregoing embodiments, when the terms "include", "including", and variations thereof are used, the terms are intended to be inclusive in the same manner as the term "comprising". The term "or" used in the present disclosure is intended not to be an exclusive OR.

(15) In the present disclosure, for example, when articles such as "a", "an", and "the" in English are added by translation, the present disclosure may include a case in which a noun following these articles is a plural form.

(16) In the present disclosure, the expression "A and B are different" may mean that "A and B are different from each other". The term may mean that "A and B are different from C". The terms such as "separated", "coupled" and the like may also be interpreted in the same manner as "different".

(17) The foregoing aspects and embodiments in the present disclosure may be used alone, or may be used in combination, or may be switched with execution. Notification of predetermined information (for example, notification of "being X") is not limited to notification performed explicitly, and may be performed implicitly (for example, notification of the predetermined information is not made).

Although the present disclosure has been described in detail above, it is apparent to those skilled in the art that the present disclosure is not limited to the embodiments described in the present disclosure. The present disclosure can be implemented as modifications and variations without departing from the spirit and scope of the present disclosure defined by the claims. Therefore, the description of the present disclosure is for the purpose of illustration and has no restrictive meaning to the present disclosure.

DESCRIPTION OF REFERENCE SIGNS 1, 1A . . . information processing system, 10, 10A . . . terminal apparatus, 11, 11A . . . processor, 12, 12A . . . memory device, 13 . . . communication device, 14 . . . display, 15 . . . input device, 16 . . . inertial sensor, 20 . . . . XR glasses, 21 . . . processor, 22 . . . memory device, 23 . . . gaze detection device, 24 . . . . GPS device, 25 . . . motion detection device, 26 . . . image capture device, 27 . . . communication device, 28 . . . display, 30, 30A . . . server, 31, 31A . . . processor, 32, 32A . . . memory device, 33 . . . communication device, 34 . . . display, 35 . . . input device, 41L, 41R . . . lens, 91, 92 . . . temple, 93 . . . bridge, 94 . . . frame, 95 . . . frame, 111, 111A . . . acquirer, 112 . . . generator, 113, 113A . . . display controller, 114 . . . determiner, 115 . . . movement controller, 116 . . . receiver, 117 . . . outputter, 311, 311A . . . acquirer, 312 . . . outputter, 313 . . . generator, 314 . . . display controller, 315 . . . determiner, 316 . . . movement controller, PR1 to PR3A . . . control program, U, U1 to U2 . . . user, VO, VO1 to VO6 . . . virtual object, VS, VS1, VS2 . . . virtual space.

The invention claimed is:

1. A display control apparatus comprising:
a memory that stores a program; and
a processor that implements the program to:
acquire a notification;
generate a virtual object corresponding to the notification;
display the virtual object on a wearable display of a first user;
determine, as a determination result, whether a distance between the virtual object and the first user is equal to or less than a first distance in a virtual space, when the first user is included in recipient information indicating one or more recipients of the notification;
bring the virtual object closer to the first user, when the determination result is affirmative; and
maintain a position of the virtual object, when the determination result is negative, wherein:
when moving the virtual object, the processor is configured to move the virtual object in a first mode, when only the first user is included in the recipient information, and
when moving the virtual object, the processor is configured to move the virtual object in a second mode, when a user other than the first user is included in the recipient information.

2. The display control apparatus according to claim 1, wherein the processor is further configured to
receive an input operation of a user for the virtual object, and
display contents of the notification corresponding to the virtual object in the virtual space in accordance with the input operation, when the determination result of the determiner is affirmative.

3. The display control apparatus according to claim 2, wherein:
the input operation for the virtual object is to direct a gaze toward the virtual object, and
the processor is configured to display contents of the notification corresponding to the virtual object in the virtual space, when the determination result is affirmative and when the gaze is directed toward the virtual object for a predetermined time or more.

4. The display control apparatus according to claim 2, wherein the processor is configured to display the contents of the notification corresponding to the virtual object in the virtual space and then hide the virtual object in the virtual space.

5. The display control apparatus according to claim 1, wherein the processor is configured to control a display form of the virtual object based on a user who is a recipient of the notification.

6. The display control apparatus according to claim 1, wherein the processor is configured to control a position at which the virtual object is displayed in the virtual space based on at least one of a time point when the processor acquires the notification or an importance level of the notification.

7. The display control apparatus according to claim 1, wherein the processor is configured to display the virtual object at a position in the virtual space, the position corresponding to a location in a real space associated with a recipient of the notification.

8. The display control apparatus according to claim 1, wherein when a plurality of users are included in the recipient information, the processor is configured to display the virtual object at a position in the virtual space, the position corresponding to a location in a real space shared by the plurality of users.

9. A display control apparatus comprising:
a memory that stores a program; and
a processor that implements the program to:
acquire a notification;
generate a virtual object corresponding to the notification;
display the virtual object on a wearable display of a first user; and
display the virtual object on a wearable display of a second user;
determine, as a determination result, whether a distance between the virtual object and the first user is equal to or less than a predetermined distance in a first virtual space, when the first user is included in recipient information indicating one or more recipients of the notification; and
bring the virtual object closer to the first user in the first virtual space, when the determination result of the determiner is affirmative, and maintain a position of the virtual object in the first virtual space, when the determination result is negative;
display contents of the notification corresponding to the virtual object in the first virtual space and then hide the virtual object in the first virtual space; and
display the virtual object in a second virtual space corresponding to the second user until the content of the notification corresponding to the virtual object is displayed in the second virtual space,
wherein:
when moving the virtual object, the processor is configured to move the virtual object in a first mode, when only the first user is included in the recipient information, and
when moving the virtual object, the processor is configured to move the virtual object in a second mode, when a user other than the first user is included in the recipient information.

* * * * *